US009898901B1

(12) United States Patent
Kurian et al.

(10) Patent No.: US 9,898,901 B1
(45) Date of Patent: Feb. 20, 2018

(54) PHYSICAL SECURITY SYSTEM FOR COMPUTER TERMINALS

(71) Applicant: Bank of America Corporation, Charlotte, NC (US)

(72) Inventors: Manu Jacob Kurian, Dallas, TX (US); Joseph Benjamin Castinado, North Glenn, CO (US)

(73) Assignee: Bank of America Corporation, Charlotte, NC (US)

( * ) Notice: Subject to any disclaimer, the term of this patent is extended or adjusted under 35 U.S.C. 154(b) by 0 days.

(21) Appl. No.: 15/365,424

(22) Filed: Nov. 30, 2016

(51) Int. Cl.
G06F 21/84 (2013.01)
G07F 19/00 (2006.01)
G07C 9/00 (2006.01)

(52) U.S. Cl.
CPC ............ G07F 19/205 (2013.01); G06F 21/84 (2013.01); G07C 9/00126 (2013.01); G07F 19/201 (2013.01)

(58) Field of Classification Search
CPC ........ G07F 21/84; G07F 19/205; G07F 19/20; G07F 19/201; G07F 19/207; G07C 9/00126; E04H 1/06; E05G 7/00; E05G 5/02; E05F 11/002
USPC .......................................... 340/5.7; 235/375
See application file for complete search history.

(56) References Cited

U.S. PATENT DOCUMENTS

| | | |
|---|---|---|
| 2,912,066 A | 11/1959 | Ellithorpe |
| 5,993,216 A | 11/1999 | Stogner et al. |
| 6,081,792 A | 6/2000 | Cucinotta et al. |
| 6,176,423 B1 | 1/2001 | Egami |
| 6,262,843 B1 | 7/2001 | Marx |
| 6,298,603 B1 | 10/2001 | Diaz |
| 6,494,363 B1 | 12/2002 | Roger et al. |
| 6,543,684 B1 | 4/2003 | White et al. |
| D492,085 S | 6/2004 | Korte et al. |
| 6,871,288 B2 | 3/2005 | Russikoff |
| 7,314,161 B1 | 1/2008 | Korte et al. |
| 7,726,557 B2 | 6/2010 | Bosch et al. |
| 8,162,207 B2 | 4/2012 | Bosch et al. |
| 8,255,499 B2 * | 8/2012 | Cacheria, III ..... G06Q 10/1057 705/16 |
| 8,332,321 B2 | 12/2012 | Bosch et al. |
| 8,499,494 B2 | 8/2013 | Robert, Jr. |
| 8,762,274 B2 | 6/2014 | Bosch et al. |

(Continued)

*Primary Examiner* — Ali Neyzari
(74) *Attorney, Agent, or Firm* — Michael A. Springs; Moore & Van Allen PLLC; Peter B. Stewart

(57) ABSTRACT

A computer terminal located in an environment may include an actuator, retractable privacy barrier attached to the computer terminal by the actuator, a display, a memory, a processor, and a terminal application stored in the memory. The actuator is typically configured to extend the retractable privacy barrier to thereby reduce viewability of the computer terminal. The terminal application is typically configured for initiating an interactive session with a user, determining that a trigger event has occurred, and in response to determining that the trigger event has occurred, transmitting a control signal to the actuator, the control signal causing the actuator to extend the retractable privacy barrier. The present invention is further configured for monitoring one or more parameters of the environment, and displaying, via the display, data associated with the one or more parameters of the environment.

20 Claims, 10 Drawing Sheets

(56) References Cited

U.S. PATENT DOCUMENTS

| | | |
|---|---|---|
| 9,235,967 B1 * | 1/2016 | Magee .................. G07F 19/201 |
| 2002/0180696 A1 | 12/2002 | Maritzen et al. |
| 2004/0262383 A1 | 12/2004 | Zielinski |
| 2007/0131757 A1 | 6/2007 | Hamilton et al. |
| 2008/0275768 A1 | 11/2008 | Berman et al. |
| 2010/0180018 A1 | 7/2010 | Cacheria, III et al. |
| 2011/0174200 A1 | 7/2011 | Bartel |
| 2013/0086465 A1 | 4/2013 | Boudville |
| 2015/0179025 A1 | 6/2015 | Cowell |

* cited by examiner

PHYSICAL SECURITY SYSTEM FOR COMPUTER TERMINALS

FIELD OF THE INVENTION

The present invention is directed to a computer terminal for providing improved privacy to users. The computer terminal typically includes an actuator and a retractable privacy barrier attached to the computer terminal by the actuator. The actuator is typically configured to extend the retractable privacy barrier to thereby reduce viewability of the computer terminal. The computer terminal is typically configured for determining that a trigger event has occurred, and in response to determining that the trigger event has occurred, transmitting a control signal to the actuator, the control signal causing the actuator to extend the retractable privacy barrier. The present invention is also configured for monitoring one or more parameters of an environment of the computer terminal and displaying, via a display, data associated with the one or more parameters of the environment.

BACKGROUND

Computer terminals are commonly used by individuals to perform a variety of activities. Computer terminals are often located in public spaces. Therefore, a needs exists for improved privacy for individuals using computer terminals located in public spaces.

SUMMARY

The following presents a simplified summary of several embodiments of the invention in order to provide a basic understanding of such embodiments. This summary is not an extensive overview of all contemplated embodiments of the invention, and is intended to neither identify key or critical elements of all embodiments, nor delineate the scope of any or all embodiments. Its purpose is to present some concepts of one or more embodiments in a simplified form as a prelude to the more detailed description that is presented later.

Embodiments of the present invention address the above needs and/or achieve other advantages by providing apparatuses (e.g., a system, computer program product and/or other devices) and methods for providing physical security at computer terminals. Particularly, embodiments of the present invention are directed to a computer terminal location in an environment, the computer terminal comprising: a display; an actuator; a retractable privacy barrier attached to the computer terminal by the actuator, the actuator being configured to extend the retractable privacy barrier, the retractable privacy barrier being configured to reduce viewability of the computer terminal after the retractable privacy barrier has been extended by the actuator; a memory; a communication interface; a processor and a terminal application. The terminal application is typically stored in the memory, and is executable by the processor. The terminal application, when executed by the processor, is configured to cause the processor to perform: initiating an interactive session with a user; determining that a trigger event has occurred; in response to determining that the trigger event has occurred, transmitting a control signal to the actuator, the control signal causing the actuator to extend the retractable privacy barrier; monitoring one or more parameters of the environment; and displaying, via the display, a graphical user interface, wherein the graphical user interface comprises data associated with the one or more parameters of the environment.

In one embodiment, or in combination with the previous embodiment, the computer terminal comprises a sensor.

In one embodiment, or in combination with any of the previous embodiments, the sensor is configured to detect a presence of the user; determining that a trigger event has occurred comprises detecting, via the sensor, the presence of the user; and the control signal is transmitted to the actuator in response to detecting, via the sensor, the presence of the user.

In one embodiment, or in combination with any of the previous embodiments, the sensor is configured to monitor a first parameter of the one or more parameters; and displaying data associated with the first parameter on the graphical user interface.

In one embodiment, or in combination with any of the previous embodiments, the sensor is configured to monitor a first parameter of the one or more parameters; determining that a trigger event has occurred comprises, based on monitoring the first parameter, determining that an environmental condition exists; and the control signal is transmitted to the actuator in response to determining that the environmental condition exists.

In one embodiment, or in combination with any of the previous embodiments, the terminal application is configured for: determining that the environmental condition no longer exists based on continuing to monitor the first parameter; and in response to determining that the environmental condition no longer exists, transmitting a second control signal to the actuator, the second control signal causing the actuator to retract the retractable privacy barrier.

In one embodiment, or in combination with the previous embodiment, the terminal application is configured for monitoring one or more biometric parameters of the user; determining that a trigger event has occurred comprises determining, based on monitoring the one or more biometric parameters of the user, that a user condition exists; and the control signal is transmitted to the actuator in response to determining that the user condition exists.

In one embodiment, or in combination with the previous embodiment, the terminal application is configured for, based on monitoring the one or more parameters of the environment, determining that an environmental condition exists; and in response to determining that the environmental condition exists, displaying an indicator that the environmental condition exists on the graphical user interface.

In one embodiment, or in combination with any of the previous embodiments, the graphical user interface comprises real-time data associated with the one or more parameters of the environment.

In one embodiment, or in combination with any of the previous embodiments, the computer terminal comprises a detachable module, the detachable module comprising the actuator and the retractable privacy barrier.

In one embodiment, or in combination with any of the previous embodiments, the terminal application is configured for displaying a diagram of at least a portion of the environment adjacent to the computer terminal on the graphical user interface.

In one embodiment, or in combination with any of the previous embodiments, the computer terminal is an automated teller machine.

In one embodiment, or in combination with any of the previous embodiments, the computer terminal environment comprises: a sensor in communication with the computer terminal, wherein the sensor is configured to sense a first parameter of the one or more parameters; a second actuator in communication with the computer terminal; a second retractable privacy barrier positioned proximate to the computer terminal, the second actuator being configured to extended the second retractable privacy barrier, the second retractable privacy barrier being configured to reduce viewability of the computer terminal after the second retractable privacy barrier has been extended by the second actuator; wherein: monitoring the one or more parameters of the environment comprises receiving, via the communication interface, data associated with the first parameter from the sensor; the terminal application is configured for, in response to determining that the trigger event has occurred, transmitting a second control signal to the second actuator, the second control signal causing the second actuator to extend the second retractable privacy barrier To the accomplishment of the foregoing and related ends, the one or more embodiments comprise the features hereinafter fully described and particularly pointed out in the claims. The following description and the annexed drawings set forth in detail certain illustrative features of the one or more embodiments. These features are indicative, however, of but a few of the various ways in which the principles of various embodiments may be employed, and this description is intended to include all such embodiments and their equivalents.

The features, functions, and advantages that have been discussed may be achieved independently in various embodiments of the present invention or may be combined with yet other embodiments, further details of which can be seen with reference to the following description and drawings.

BRIEF DESCRIPTION OF THE DRAWINGS

The present invention is further described in the detailed description which follows in reference to the noted plurality of drawings by way of non-limiting examples of embodiments of the present invention in which like reference numerals represent similar parts throughout the several views of the drawings and wherein.

DETAILED DESCRIPTION OF EMBODIMENTS OF THE INVENTION

Figure 1:
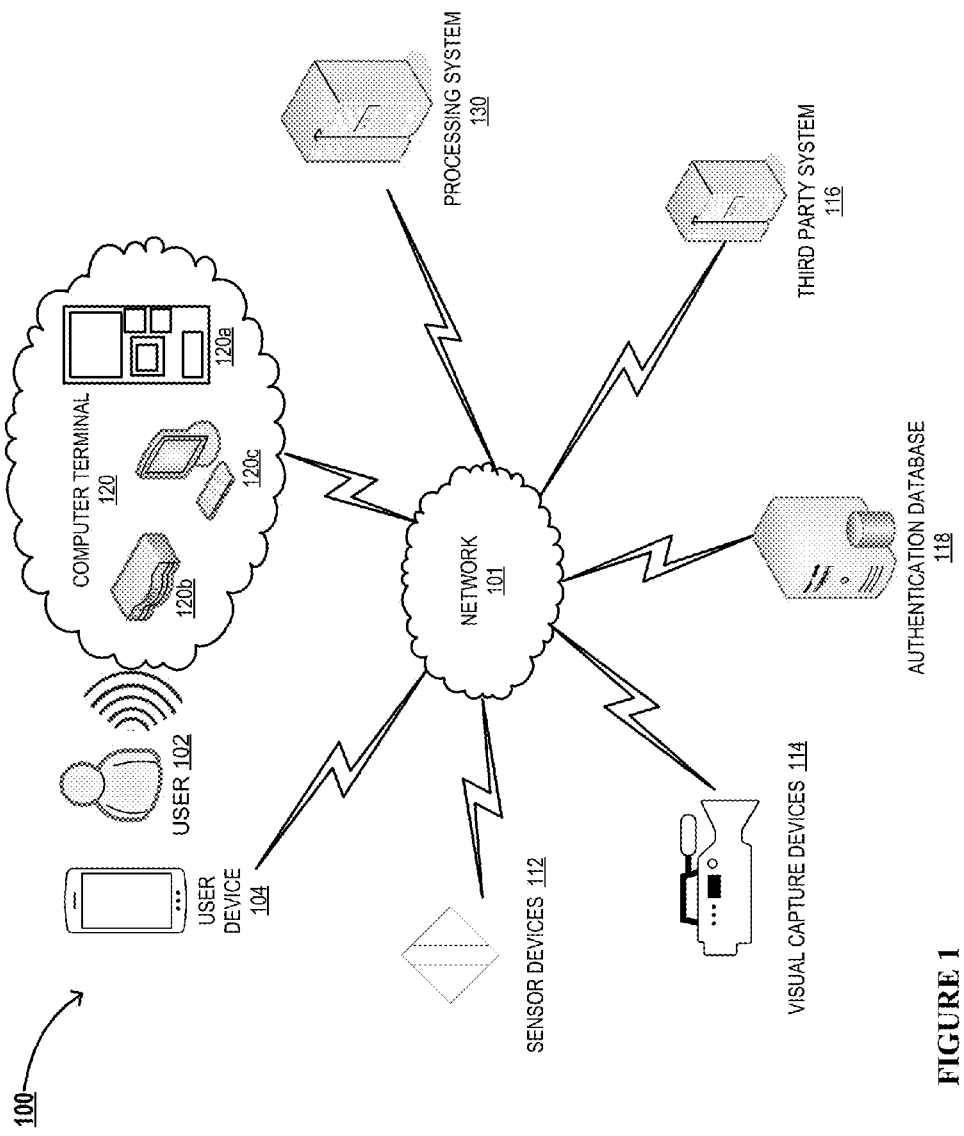
FIG. 1 illustrates a block network architecture diagram illustrating a system environment 100 for providing physical security at computer terminals, in accordance with an embodiment of the invention.

Embodiments of the present invention now may be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure may satisfy applicable legal requirements. Like numbers refer to like elements throughout. Where possible, any terms expressed in the singular form herein are meant to also include the plural form and vice versa, unless explicitly stated otherwise. Also, as used herein, the term "a" and/or "an" shall mean "one or more," even though the phrase "one or more" is also used herein. Furthermore, when it is said herein that something is "based on" something else, it may be based on one or more other things as well. In other words, unless expressly indicated otherwise, as used herein "based on" means "based at least in part on" or "based at least partially on."

In some embodiments, an "entity" as used herein may be any institution, establishment or enterprise, associated with a network connected resource transfer platform, and particularly geolocation systems and devices. As such, the entity may be any institution, group, association, financial institution, merchant, establishment, company, union, authority or the like. Typically, the entity is associated with one or more computer terminals. Typically, the entity owns the computer terminals, operates computer terminals, provides the computer terminal devices, facilitates services associated with the computer terminals, and/or is otherwise associated with the computer terminals.

As described herein, a "user" is an individual associated with an entity. As such, in some embodiments, the user may be an individual having past relationships, current relationships or potential future relationships with an entity. In some instances, a "user" is an individual who has a relationship with the entity, such as a customer or a prospective customer. In some instances described herein, the user is an individual who seeks to utilize, operate, or perform one or more activities associated with a computer terminal, typically based on successful validation of the user's authentication credentials. In some embodiments, a "user" may be an employee (e.g., a technology operator/technician, an associate, a project manager, an IT specialist, a manager, an administrator, an internal operations analyst, or the like) of the entity or enterprises affiliated with the entity, capable of operating the systems and computer terminals described herein. In other embodiments, a user may be a system or an entity performing one or more tasks described herein.

The term "computer terminal" as used herein may refer to one or more electronic devices that facilitate one or more user activities or transactions. Typically, a computer terminal is configured to facilitate performance of one or more user activities by establishing an "interactive session" between a user and the computer terminal. As such, the terms "user activity" or "user transaction" or simply "activity" may refer to financial or non-financial activities, tasks, events or actions. In some embodiments a computer terminal refers to one or more devices that facilitate execution of financial transactions or activities. In this regard, the computer terminals may be Automated Teller Machines (ATMs), Point of sale (POS) devices, vending machines, checkout registers, ticket vending machines, automated retail transaction devices, banking terminals in a financial institution and other computing devices that involve financial user activities or transactions in one form or another, or may comprise technology elements and/or functionality of one or more aforementioned devices. In some embodiments the computer terminal refers to devices that facilitate execution of non-financial user activities or transactions, for example, check-in terminals for various industries, for example: hospitality, travel, healthcare and the like, information kiosks and other computer terminals that do not involve a user performing a financial transaction via the computer terminal. In some embodiments the computer terminals enable execution of both financial and non-financial transactions/activities. That said, computer terminals may also refer to portable devices that facilitate financial and/or non-financial transactions, such as personal computers, laptop computers, tablet computers, smartphones, wearable devices, personal digital assistants (PDAs), and other computing devices. In some embodiments, the computer terminals may be owned, operated and/or otherwise associated entities and are installed at suitable locations, such that the user can travel to the location of the computer terminal to perform user activities or execute transactions. In some embodiments, the computer terminals may be owned, operated and/or otherwise associated with the user. In embodiments described herein, performing a user activity or transaction may refer to the initiation, stages during the processing, or completion of a transaction.

Typically, the user may provide authentication credentials for conducting user activities or transactions at the computer terminal. In some embodiments, computer terminals require the user to perform one or more authentication steps based on the level of authorization desired for a particular user activity or transaction. In this regard, for example, the user may slide cards with magnetic strips, provide one or more account numbers, user identifiers or userID and the like and further may provide the accompanying personal identification numbers (PIN), passwords, CVV numbers and the like associated with the individual computer terminal and/or the individual card/account provided for authentication.

Many of the embodiments and illustrative example implementations thereof described herein are directed toward solving a pervasive technical problem, namely that computer terminals often provide inadequate privacy to users. In this regard, many computer terminals, such as automated teller machines, are located in public spaces. Accordingly, other individuals in those spaces may be able to perceive information displayed on a display of a computer terminal or view specific interactions between the computer terminal and a user. For example, if the computer terminal is an automated teller machine (ATM), individuals in the proximity of the ATM may be able to perceive account information displayed on the ATM or ascertain that an individual has withdrawn cash from the ATM.

Another problem associated with the use of computer terminals is that users of such computer terminals focus their attention on a display or other interface of a computer terminal, thereby reducing users' awareness of their surroundings. For example, the user of an ATM may focus their attention on a display of the ATM, and so the user may be less likely to perceive that another individual is located behind the user and close enough to view account information on the display of the ATM.

In order to solve these technical problems and provide additional advantages, in one aspect, the present invention relates to a computer terminal that includes a retractable privacy barrier attached to the computer terminal by an actuator, as described in detail herein. The actuator may extend the retractable privacy barrier once a user initiates an interactive session with the computer terminal. Alternatively, the actuator may extend the retractable privacy barrier after the computer terminal has detected a different trigger event, such as determining that other individuals are in the proximity of the computer terminal. This retractable privacy barrier typically reduces the ability of other individuals in the proximity of the computer terminal to view the computer terminal (e.g., by reducing the viewability of the computer terminal's display or other interface devices). The computer terminal is also typically configured to monitor parameters of the environment in which the computer terminal is located (e.g., via one or more sensors). Information about the environment (e.g., a real-time diagram of the environment immediately proximate to the computer terminal) may be displayed on the computer terminal's display. By providing environmental information on the computer terminal's display, the user may maintain awareness of their surroundings even while focusing attention on the computer terminal's display. These functions and features will be described in detail henceforth with respect to FIGS. 1 to 10.

In general, embodiments of the present invention relate to electronic devices, systems, apparatuses, methods and computer program products for providing physical security for users at computer terminals. As discussed above, in some embodiments of the inventions, a computer terminal is provided that has been equipped with a privacy module comprising an actuator and an associated retractable privacy barrier. In this regard, in some embodiments, the privacy module is a built-in feature of the computer terminal. In other embodiments, a stand-alone, detachable privacy module or a detachable module is provided that is configured to be operatively coupled to a computer terminal.

Referring to FIG. 1, a block diagram illustrating a system environment 100 configured for providing physical security at computer terminals, is illustrated, in accordance with some embodiments of the invention. As illustrated, the system environment 100 may comprise a computer terminal 120, in operative communication with one or more user devices 104 associated with a user 102, a processing system 130, one or more sensor devices 112, one or more visual capture devices 114, an authentication database 118, a third party system 116 and/or other systems/devices not illustrated herein, via a network 101. As such, the computer terminal 120 is configured such that the user 102 may perform one or more user activities or transactions by utilizing the computer terminal directly (for example, by physically operating the computer terminal 120 and its interfaces, using input/output devices of the terminal 120, using audio commands, using physical gestures, and the like) and/or via communication between the user device 104 and the terminal 120 (for example, by establishing operative communication channels between the user device 104 and the terminal 120 via a wireless network and interacting with the terminal 120 via the devices and interfaces of the user device 104).

Typically, the processing system 130 and the authentication database 118 are in electronic communication with the computer terminal 120, via the network 101, which may be the internet, an intranet or the like. In FIG. 1, the network 101 may include a local area network (LAN), a wide area network (WAN), a global area network (GAN), and/or near field communication (NFC) network. The network 101 may provide for wireline, wireless, or a combination of wireline and wireless communication between devices in the network. In some embodiments, the network 101 includes the Internet. In some embodiments, the network 101 may include a wireless telephone network. Furthermore, the network 101 may comprise wireless communication networks to establish wireless communication channels such as a contactless communication channel and a near field communication (NFC) channel (for example, in the instances where communication channels are established between the user device 104 and the computer terminal 120). In this regard, the wireless communication channel may further comprise near field communication (NFC), communication via radio waves, communication through the internet, communication via electromagnetic waves and the like.

As discussed previously, the computer terminal 120 is configured to facilitate performance of user activities, and is configured to provide real-time interactive sessions for the user 102. In some embodiments, the computer terminal 120 is an ATM 120a configured for facilitating user activities, while ensuring the security and privacy of the user. In some embodiments, the computer terminal 120 is a point of sale terminal 120b, a computing device 120c, a vending machine, a kiosk, and/or another device that is configured to facilitate the user activity. The components of the computer terminal 120, its features and functions will be described in detail through this disclosure and with respect to FIG. 2, in particular.

In some embodiments, the computer terminal 120 receives signals, images and other data captured by the sensor devices 112 and/or the visual capture devices 114, during its execution of user activities. In this regard, in some embodiments, the computer terminal 120 communicates with, transmits instructions, and/or receives signals from the sensor devices 112 and the visual capture devices 114 directly, via the network 101, typically, in real-time. In some embodiments, the computer terminal 120 communicates with the sensor devices 112 and the visual capture devices 114 through the processing system 130, typically, in real-time. Analyzing the signals received from the sensor devices 112 and the visual capture devices 114 typically enables the computer terminal 120, the processing system 130, or the devices 112 and 114 themselves, to determine user location, determine trigger events, capture one or more parameters associated with the environment or physical location of the computer terminal 120, and the like.

In some embodiments, the sensor devices 112 are position sensors configured to sense or determine the position and/or location of the user 102, other individuals, objects/devices, or entities. As such, the sensor devices 112 may determine an absolute position (for example, location/positioning coordinates) or a relative position (for example, with respect to the position of the terminal 120, with respect to position of the user or another individual, with respect to the sensor 112 itself or a predetermined object and the like) of the user, individual or object. Here, in some embodiments, the sensor devices 112 are proximity sensors that are configured to determine the presence of the user or object within a predetermined proximity area. These sensor devices 112 may be contact type sensors that determine the presence of the user or object based on contact, or non-contact type sensors that detect distant users or objects. Typically, the sensor devices 112 comprise a first transducer that is configured to convert electrical energy into a proximity signal (for example, an electromagnetic wave, a sound wave, and the like) that is broadcast in a predetermined proximity area. The incidence of the proximity signal on physical users or objects within the proximity area results in a return signal/wave that is captured by the sensor 112. The return signal/wave is then converted to an electric signal by a second transducer of the sensor. This electric signal may be analyzed, in real-time, by the sensor 112, the terminal 120, and/or the processing system 130, to determine the location of the user/object and/or track movement of the user/object. Here, the sensor 112 may be configured to perform modulation, demodulation, amplification and output switching of the proximity and return signals.

For example, in some embodiments, the sensor devices 112 comprise ultrasonic sensors that are configured to transmit a proximity signal comprising sound waves (typically with frequencies above 18 kHz) and are further configured to receive a return signal in the form or an echo, which is then converted to an electric signal for analysis. As another example, in some embodiments, the sensor devices 112 comprise optical sensors or photoelectric sensors that are configured to transmit a proximity signal comprising electromagnetic waves, and specifically light waves (for example, infrared waves with frequencies in the range of about 600 GHz to 430 THz, such as pulsed infrared or visible red waves, laser waves in the visible or infrared frequency range, and the like) and are further configured to receive a return signal, either in the form of a reflection signal or interruption of the light proximity signal at receiver associated with the sensor 112, which is then converted to an electric signal for analysis. As yet another example, the sensor devices 112 comprise inductive proximity sensors and inductive position sensors for determining the presence and position, respectively, of users and objects, which generate an induction loop to thereby produce a proximity signal in the form or a magnetic field. The presence of users or objects varies the current flowing through the loop which facilitates determination of presence of users or objects. In some embodiments, the sensor devices 112 comprise sensor devices provided in the user device 104, such as, biometric sensors (for example, fingerprint scanner of a mobile phone, heart rate or temperature monitor of a wearable user device, and the like), location sensors (for example, GPS devices, accelerometers, and the like), visual capture devices/cameras, facial recognition devices, devices for capturing user gestures (for example, a touch screen) and other sensing devices of the user device 104. Here, the terminal 120 and/or the processing system 130 may transmit control signals to the user device to cause the sensing devices of the user device 104 to capture one or more parameters and/or to transmit one or more captured parameters.

The visual capture devices 114 typically comprise cameras and other audio, video and image capture devices. These visual capture devices 114 are configured to capture images and/or video streams, typically in real-time, of a predetermined proximity area. The images and/or video streams may be analyzed by the computer terminal 120, the processing system 130 and/or the capture devices 114, to determine the presence and position of the user, other individuals or objects and their movement in the proximity area. Although described separately, it is understood that the visual capture devices 114 may be associated with the sensor devices 112. As such, sensors or sensor devices, as alluded to herein, may refer to the various sensor devices described herein and the visual/image capture devices described herein.

As alluded to previously, the processing system 130 is in operative communication with the computer terminal 120. In some embodiments, processing system 130 is configured to transmit control instructions that are configured to cause the computer terminal 120, the user device 104, the sensor device 112 and/or the visual capture devices 114 to perform at least a portion of the steps associated with one or more activities. The processing system 130 may be associated with the same entity as the computer terminal 120 or may be associated with another entity. The structure and components of the processing system 130 is described in detail with respect to FIG. 3. The computer terminal 120 may further communicate with the third party system 116 and/or the authentication database 118, either directly or via the processing system 130. The authentication database 118 may comprise authentication credentials associated with the user. The processing system 130 and/or the computer terminal 120 may retrieve the authentication credentials from the authentication database to authenticate the user prior to executing one or more user activities or transactions.

The user device 104 may comprise a mobile communication device, such as a cellular telecommunications device (i.e., a smart phone or mobile phone), a computing device such as a laptop computer, a personal digital assistant (PDA), a mobile internet accessing device, or other mobile device including, but not limited to portable digital assistants (PDAs), pagers, mobile televisions, gaming devices, laptop computers, cameras, video recorders, audio/video player, radio, GPS devices, any combination of the aforementioned, or the like. As discussed previously, in some embodiments, the computer terminals 120 of the present invention are configured to establish operative communication channels with the user device 104 such that, the user 102 may perform one or more user activities, either entirely or in part, at the terminal 120 by interacting with the user device 104. The user device 104 is described in detail with respect to FIG. 4.

Figure 2:
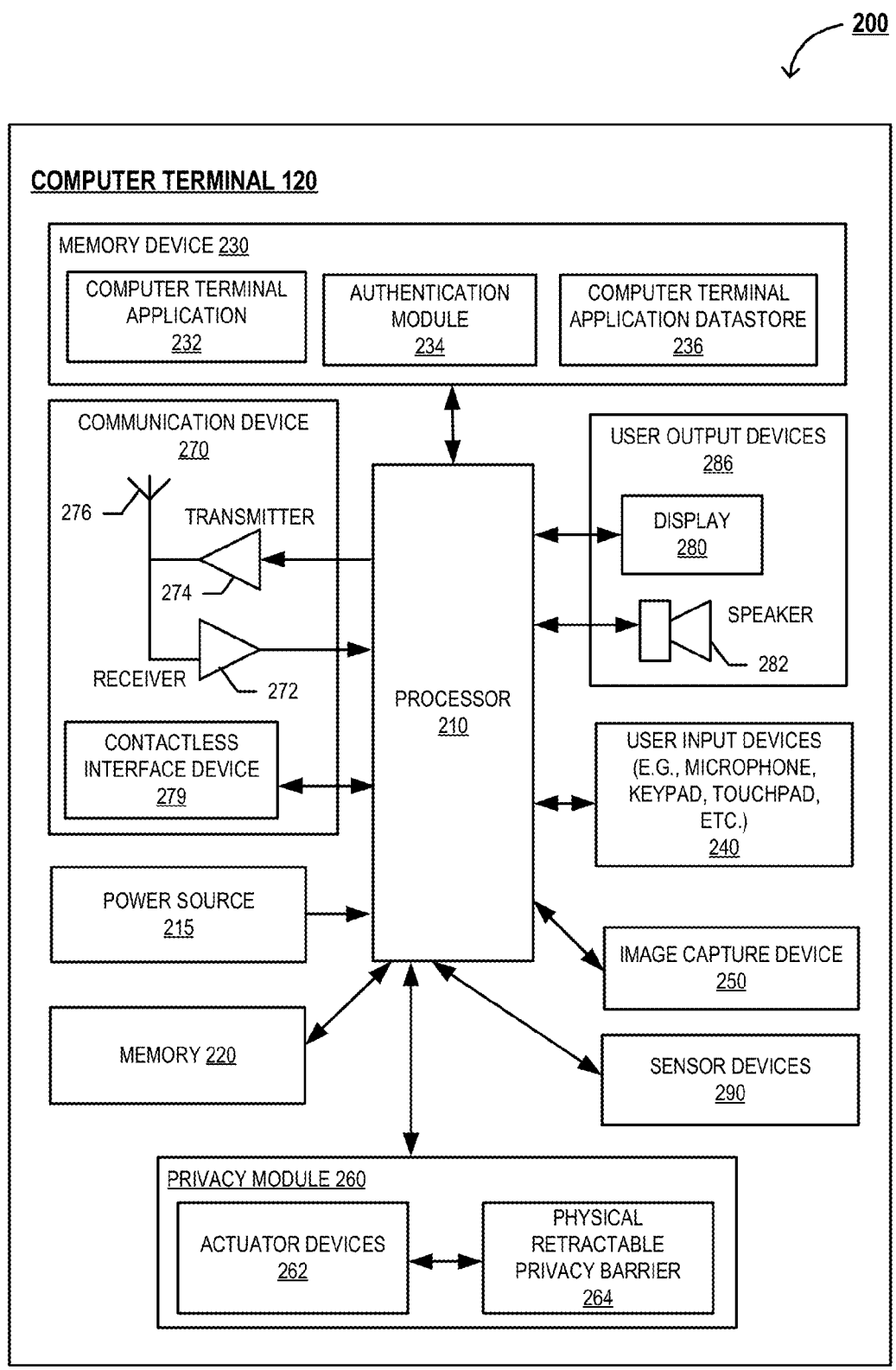
FIG. 2 illustrates a block diagram 200 of a computer terminal system, in accordance with an embodiment of the invention.

FIG. 2, illustrates a block diagram 200 of the computer terminal 120 system, in accordance with some embodiments of the invention. As discussed previously, the computer terminal 120 is configured to facilitate performance of user activities, and is configured to provide real-time interactive sessions for the user 102. The computer terminal 120 typically includes a processing device or a processor 210, memory device 230, storage memory 220 or datastore 220, and a communication device 270. As such, the computer terminal 120, and the processor 210 is particular, is configured to perform at least a portion of the steps of the embodiments described herein, either based on executing computer readable instructions stored in the memory device 230, and/or based on receiving instructions, indications, or signals from other systems and devices such as the processing system 130, the user device 104, sensor devices 112, visual capture devices 114, the user 102, and/or other systems. In some embodiments, the processing system 130 is configured to transmit control instructions to, and cause the processing device 210 to perform one or more steps of the embodiments presented herein. For example, the processing system 130 may detect a trigger event and transmit an indication to the processing device 210. In response to receiving the control signal from the system 130, the processing device 210 may initiate a presentation of environment parameters.

The processing device 210 may generally refer to a device or combination of devices having circuitry used for implementing the communication and/or logic functions of the computer terminal 120. For example, the processing device 210 may include a control unit, a digital signal processor device, a microprocessor device, and various analog-to-digital converters, digital-to-analog converters, and other support circuits and/or combinations of the foregoing. Control and signal processing functions of the computer terminal 120 may be allocated between these processing devices according to their respective capabilities.

The computer terminal 120 may further include various components/devices in operative communication with and/or controlled by the processor 210, such as user output devices 286, user input devices 240, a network communication interface 279 (such as a contactless interface 279), a power source 215, and the like. Furthermore, in some embodiments, the processor 210 is operatively coupled to and is configured to control other components/devices of the computer terminal 120, such as an image capture device 250, sensor devices 290, a physical privacy module 260 and the like. These components and devices are described in detail below.

The memory device 230 and the storage memory 220 may generally refer to a device or combination of devices that store one or more forms of computer-readable media for storing data and/or computer-executable program code/instructions. In some embodiments, the storage memory 220 is integral with the memory device 230. In some embodiments, the memory device 230 comprises a non-transitory, computer readable storage medium. For example, the memory device 230 and/or the storage memory 220 may include any computer memory that provides an actual or virtual space to temporarily or permanently store data and/or commands provided to the processing device 210 when it carries out its functions described herein.

As illustrated by FIG. 2, the memory device 230 typically comprises a computer terminal application 232 (also referred to as a terminal application), an authentication module 234, a computer terminal application datastore 236 stored therein. In some embodiments, the authentication module 234 is integral with the computer terminal application 232. In some embodiments, the computer terminal applications 232 and/or the authentication module 234 may be executable to initiate, perform, complete, and/or facilitate one or more portions of any embodiment described and/or contemplated herein, either independently or in response to receiving control instructions from the processing system 130. In some embodiments, the computer terminal application/module 232 comprises computer readable instructions stored in the memory device 230, which when executed by the processing device 210, are configured to cause the processing device 210 to perform one or more steps of the embodiments presented herein, and/or cause the processing device to transmit control instructions to other components of the terminal 120 and other devices/systems in the network 101 to cause them to perform the steps. Generally, the computer terminal application 232 is executable to receive activity instructions from the user and perform typical computer terminal functions in addition to the specific steps of the embodiments presented herein, as appreciated by those skilled in the art. The computer terminal application 232 may be coupled to a computer terminal application datastore 236 for storing application data as the user activity is being performed. The computer terminal application datastore 236 may store the application data temporarily for the predetermined duration of the execution of the activity (such as a memory buffer, or cache memory), or permanently.

The computer terminal 120 may require users to identify and/or authenticate themselves before the computer terminal 120 may initiate, perform, complete, and/or facilitate a user activity. For example, in some embodiments, the computer terminal 120 is configured (and/or the computer terminal application 232 is executable) to authenticate a computer terminal user based at least partially on a computer terminal debit card, smart card, token (e.g., USB token, etc.), user-name, password, PIN, biometric information, and/or one or more other credentials that the user presents to the computer terminal 120. Additionally or alternatively, in some embodiments, the computer terminal 120 is configured to authenticate a user by using one-, two-, or multi-factor authentication. For example, in some embodiments, the computer terminal 120 requires two-factor authentication, such that the user must provide a valid debit card and enter the correct PIN associated with the debit card in order to authenticate the user to the computer terminal 120. However, either alternatively or in addition to the aforementioned authentication features, the computer terminal 120 may require biometric authentication of the user 102 before initiating, performing, completing, and/or facilitating a user activity.

In some embodiments, the authentication module 234 comprises computer readable instructions that when executed by the processing device 210 cause the processing device to perform one or more functions and/or transmit control instructions to other components or devices to perform one or more authentication steps described herein. These authentication steps typically include requesting authentication credentials from the user via the user output devices 286 (for example, based on determining the desired authorization level for the user activity), activating pertinent sensors and devices for receipt of the credentials (sensor devices 290/image capture devices 250 for biometric credentials, card reader devices 240 for reading magnetic strips of the user's card(s), contact less interface device 279 for receiving authentication tokens from a user device via NFC channels, and the like), receiving authentication credentials, validating the credentials (for example based on retrieving user credentials from the datastore 236, memory 220, processing system 130 and/or database 118), and the like. That said, as shown, the processing device 210, in turn, is operatively connected to and is also configured to control and cause the communication device 270, the memory device 230, and other components described herein to perform one or more functions, at least in part.

The communication device 270 may comprise a modem 271 (not illustrated), a receiver 272, a server 273 (not illustrated), a transmitter 274, transceiver, and/or another device for communicating with other devices and systems on the network 101. The communication device 270 may further comprise a contact, contactless, wireless and/or wired interface that is configured to establish communication between components of the computer terminal 120, between the computer terminal 120, particularly the processing device 210, and other devices or systems, such as the processing system 130, the user device 104, the authentication database 118, the third party system 116, and the like. In this regard, the communication interface 270 comprises a transmitter 274, a receiver 272, a broadcasting device 276 to transmit and receive signals from corresponding devices via a suitable transmission medium or a communication channel. In some embodiments, the computer terminal 120 is configured to be coupled/connected to other devices and systems via wired communication channels. In other embodiments, the computer terminal 120 is configured to be coupled/connected to other devices via a wireless channel. In this regard, the wireless communication channel may comprise near field communication (NFC), communication via radio waves, communication through the internet, communication via electromagnetic waves and the like. The communication device 270 may further comprise a contactless interface device 279 for establishing contactless communication with other devices, such as the user device 104. Here, the computer terminal 120 may include a transceiver, i.e., one or more antennas and and/or other electronic circuitry, devices, and software, for receiving data when a device is held close to or tapped at a suitable location of the computer terminal 120. Here, radio frequency signals may be transmitted and received in the radio frequency band, such as 13.56 MHz which is generally the frequency for NFC. In one embodiment, the ISO/IEC 14443 standard may define the protocol associated with the data carried by these radio frequency signals. In one embodiment, the transmitter 274 and receiver 272 may transmit and receive radio frequency signals, respectively, from the computer terminal 120 within a distance of up to approximately 25 cm, and from 0-20 cm, such as from 0-15 cm, and 0-10 cm, and the like.

Establishing the communication channels may also include signaling information in accordance with the air interface standard of the applicable cellular system of the wireless telephone network that may be part of the network 101. In this regard, the computer terminal 120 may be configured to operate with one or more air interface standards, communication protocols, modulation types, and access types. By way of illustration, the computer terminal 120 may be configured to operate in accordance with any of a number of first, second, third, and/or fourth-generation communication protocols and/or the like. For example, the computer terminal 120 may be configured to operate in accordance with second-generation (2G) wireless communication protocols IS-136 (time division multiple access (TDMA)), GSM (global system for mobile communication), and/or IS-95 (code division multiple access (CDMA)), or with third-generation (3G) wireless communication protocols, such as Universal Mobile Telecommunications System (UMTS), CDMA2000, wideband CDMA (WCDMA) and/or time division-synchronous CDMA (TD-SCDMA), with fourth-generation (4G) wireless communication protocols, and/or the like. The computer terminal 120 may also be configured to operate in accordance with non-cellular communication mechanisms, such as via a wireless local area network (WLAN) or other communication/data networks The user interface of the computer terminal 120 may include user input devices 240 and user output devices 286, as illustrated by FIG. 2. The user interface of the computer terminal 120 is typically configured to facilitate the interactive sessions with the user. The user output devices 286 typically include a display 280 (e.g., a liquid crystal display, a touchscreen display, and/or the like) which is operatively coupled to the processing device 210. In some embodiments, where the computer terminal 120 requests the user's signature (if needed), the display may also serve as a touchpad input device to input the user's signature via a stylus. Other output devices may include one or more LEDs or an audio speaker 282, both which may indicate to the user various steps of a user activity. The output devices 286 including the display 280 typically provide instructions and information to the user, regarding the user activity and steps associated with the user activity. The user interface 126 may include any number of user input devices 240 allowing the computer terminal 120 to transmit/receive data to/from the user 102, such as a keypad, keyboard, touch-screen, touchpad, microphone, mouse, joystick, other pointer device, button, soft key, and/or other input device(s). A printer that can print paper receipts may also be incorporated into the computer terminal 120. In some embodiments, the retractable privacy barrier 264 comprises one or more screens, display devices 280, and/or speakers 282 for presenting trigger information, environment information, real time news feeds, user activity information, and the like, based on receiving instructions from the processor 210.

In some embodiments, the user output device 286 is an interface headset (not illustrated), that is typically configured to be adorned by the user 102 and is operatively coupled to the terminal 120 via wireless communication channels. These wireless communication channels may be encrypted to ensure the security of user data. The interface headset is configured to provide augmented reality and virtual reality experiences to the user as the user is performing one or more user activities at the terminal.

As illustrated by FIG. 2, the computer terminal may further comprise an image capture device 250. The image capture device 250 typically comprises cameras and other audio, video and image capture devices. The image capture device 250 is configured to capture images and/or video streams, typically in real-time, of a predetermined proximity area in the vicinity of the computer terminal 120 location. The images and/or video streams may be analyzed by the computer terminal 120 to determine the presence and position of the user, other individuals or objects and their movement in the proximity area, to identify the user for authentication or facial recognition purposes, and the like. In some embodiments, the system is configured to present a customized interface for the user based on identifying the user using facial recognition. In some embodiments, the system is configured to present a predetermined security interface (described in detail with respect to FIG. 9) or implement other security measures, based on identifying a predetermined individual at the terminal 120 using facial recognition.

In some embodiments, the computer terminal further comprises sensor devices 290. In some embodiments, the processor 210 communicates with, transmits instructions, and/or receives signals from the sensor devices 290, in real-time for detecting the presence of the users or other individuals, determining user location, capturing authentication credentials for the user, determining parameters associated with the user, determining trigger events, capturing one or more parameters associated with the environment or physical location of the computer terminal 120, and the like. These sensor devices 112 may be contact type sensors that determine the presence of the user or object based on contact, or non-contact type sensors that detect distant users or objects. In some embodiments, the sensor devices 290 of the computer terminal are similar to the sensor devices 112 described previously, for determining the absolute or relative position, location, and proximity of the user, other individuals, or predetermined objects (such as vehicles, and vehicle features like contours of windows), within a predetermined proximity area. For example, the sensor devices 290 may comprise ultrasonic sensors, optical sensors, photoelectric sensors, capacitance sensors, inductive proximity/position sensors, visual capture devices (as described with respect to image/visual capture devices 114 and 250), and the associated transducers, transmitter and modulators, described in detail previously.

In some instances, the sensor devices 290 comprise biometric sensors for capturing parameters associated with the user, such as fingerprint scanners, voice recognition sensors, facial recognition sensors, heart rate sensors, user stress level sensors and the like. These biometric sensors 290 are configured to retrieve, receive, analyze and or validate biometric credentials associated with the user. In this regard, the biometric sensors 290 may comprise optical sensors, ultrasonic sensors, and/or capacitance sensors. The biometric sensors may further comprise radio frequency, thermal, pressure, piezo-resistive/piezoelectric, microelectromechanical sensors, and the like.

As further illustrated by FIG. 2, the computer terminal 120 comprises a privacy module 260. This privacy module 260 typically is a physical module that is integral with the computer terminal 120, in some embodiments. In other embodiments, the privacy module (also referred to as a "detachable module") is a stand-alone module that is detachable from, and configured to be operatively coupled to the computer terminal 120. In these embodiments, the detachable module may further comprise one or more sensor devices 290. The privacy module 260 comprises one or more actuator devices 262 that are each operatively coupled to one or more physical retractable privacy barriers 264. Each actuator 262 is typically configured to extend and/or retract the associated retractable privacy barrier 264 to a predetermined length in response to receiving control instructions (such as second control signals) from the processor 210. Typically, the privacy module 260 (in both its detachable and integrated embodiments), and the barriers 264 and the actuators 262 in particular, and configured to be customizable to suit requirements at any computer terminal 120. The computer terminal 120, and particularly the processor 210, is configured to cause the extension of the retractable privacy barrier 264 by the actuator 262, to reduce the viewability of the computer terminal 120 after the barrier has been extended, and cause retraction of the barrier at a predetermined time, for example, after completion of user activity or a safety confirmation trigger. In some embodiments, reducing the viewability of the computer terminal 120 refers to reducing the clarity of the view of at least a portion of the terminal and/or reducing the visibility of the at least a portion of the terminal when viewed from a predetermined location in the vicinity of the terminal 120. For example, reduction in the clarity of the view may comprise reduction of the sharpness of the characters and images displayed on the display 280 when viewed through the barrier, causing user actions such as providing credentials on a keypad, or withdrawing currency from the terminal to appear blurred, undiscernible and/or imperceptible when viewed through the barrier, and the like. In addition to the above, in some embodiments, reducing the viewability refers to at least partially obstructing/hindering the view or completely blocking the view, when seen from a predetermined location (such as a location of another individual in the vicinity of the user), providing physical barriers for at least partially or fully hindering physical contact, and the like. The retractable privacy barrier 264 may be extended to reduce the viewability of the computer terminal 120 itself, reduce viewability of predetermined portions of the computer terminal 120 (such as the display 280, keypads/touchpads, and the like), reduce viewability of the user situated at the terminal 120, and the like.

That said, in some embodiments, reducing the viewability of the terminal comprises, presenting at least a portion of the user interface, via the interface headset, such that the user data is only visible/discernable to the user adorning the interface headset and not to any individuals located around the user.

Extension of the retractable privacy barrier 264 over a predetermined distance refers to linear displacement (extension/retraction) for a predetermined length, and/or angular displacement/rotation of the barrier with respect to a predetermined axis for a predetermined angle, as will be described in detail with respect to FIGS. 6-8. The actuator devices 262 are configured to convert a control signal (for example, an electronic signal received from the processor 210, or a tactile indication from the user) into mechanical motion (physical extension/retraction of the retractable privacy barrier 264 over a predetermined distance).

In some embodiments, the actuator devices 262 are mechanical actuators or electro-mechanical actuators employing screw-bolt arrangements, gear arrangements, and the like, coupled to an electric motor for causing extension of the retractable privacy barrier 264 in linear/angular directions.

In some embodiments, the actuator devices 262 comprise hydraulic actuators generally having a cylinder (or fluid motor) with a piston arrangement, wherein the hydraulic fluid exerts pressure on the piston causing linear, rotary or oscillatory motion of the piston. The hydraulic actuators may be single acting or double acting. As such, the hydraulic actuator devices 262 may comprise hydraulic cylinders, position-sensing hydraulic cylinders, hydraulic motors, telescopic cylinders, and the like.

In some embodiments, the actuator devices 262 comprise pneumatic actuators employing compressed air/gases or vacuum for causing linear/angular extension of the retractable privacy barrier 264. In some instances, the pneumatic actuator devices 262 comprise a cylinder and piston/diaphragm arrangement, along with valve systems and the like.

In some embodiments, the actuator devices 262 comprise magnetic actuators generally employing magnetic fields/flux and utilizing forces (for example, Lorentz forces) generated when metallic objects interact with the magnetic field/flux to subsequently cause linear, rotary or oscillatory motion of the barrier.

In some embodiments, the actuator devices 262 comprise piezoelectric actuators and/or ultrasonic motors. This typically involves applying voltages to piezoelectric materials for causing expansion of the material, and in turn movement of the retractable privacy barrier 264. In some instances, piezoelectric actuators are employed in addition to the aforementioned actuators for short range motions, fine positioning or fine position correction of the retractable privacy barrier 264. That said, the actuator devices 262 may comprise one or more of mechanical actuators, electro-mechanical actuators, hydraulic actuators, motors, pneumatic actuators, magnetic actuators and piezoelectric actuators, based on the configuration of the barrier and the desired range and type of motion of the barrier.

Each retractable privacy barrier 264 may be a single/contiguous element or may comprise multiple structures or parts. In the instances where the retractable privacy barrier 264 comprises multiple parts, in some embodiments each of these parts may be individually controllable by the actuators 262, while in other embodiments, movement of these parts may be effected by the movement of the barrier itself. In some embodiments, the retractable privacy barrier 264 may be a rigid barrier, while in other embodiments, the barrier may be at least partially flexible.

The retractable privacy barrier 264 may be manufactured out of suitable materials such as metals, alloys, plastics, composites, natural or synthetic materials, polymers and the like, or a combination thereof. Metallic materials may include suitable grades of stainless steel, carbon steels, other ferrous metals and alloys, aluminum and its alloys, tin, lead, and the like. Plastic materials may include polypropylene (PP), polycarbonate (PC), polyvinyl chloride, Low-density polyethylene (LDPE), Polystyrene (PS), Acrylonitrile butadiene styrene (ABS), and the like. Composite materials may include fiber-reinforced plastics, ceramic composites, metal matrices, metal composites, plywood, and the like. The retractable privacy barrier 264 may also be made of glass, acrylic or ceramic materials.

The materials may be chosen for the specific application based on their strength, ductility/malleability, weight, rigidity/flexibility, durability, resistance to fatigue and creep, corrosion resistance, magnetic properties and the like. In some embodiments, the barrier materials may be chosen such that the barrier has a predetermined structural integrity and strength to provide safety to the user from a physical force/impact applied on the barrier. In some embodiments, the retractable privacy barrier 264 is opaque, while in other embodiments, the barrier may be translucent. In some embodiments, the retractable privacy barrier 264 is configured to allow visibility from one side and block the view when viewed from the opposite side. For example, the retractable privacy barrier 264 may be present between the user and another individual in the vicinity, with the user being one a first side of the barrier and the individual on a second side. The user may be able to perceive the individual through the retractable privacy barrier 264 from the first side (the barrier being translucent or transparent when viewed from the first side), while the barrier may be opaque when viewed from the second side, and block the view of the individual viewing from the second side. In some embodiments, the barrier materials may be chosen based on their ability to withstand, prevent or reflect physical penetration and/or wave penetration/permeation. For example, the material may be chosen such that the barrier is configured to reflect/block penetration of a predetermined type of wave (such as, x-rays, infrared waves, radio waves, and the like), to protect the user within the barrier enclosure.

Figure 3:
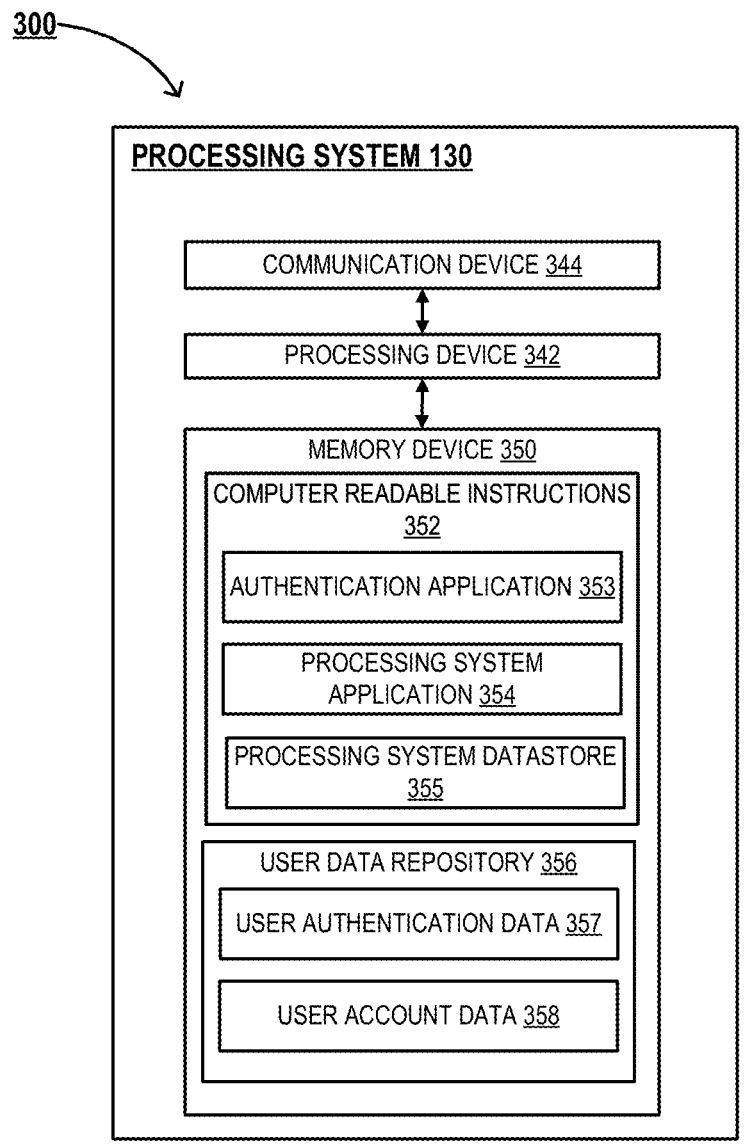
FIG. 3 illustrates a block diagram 300 of a processing system, in accordance with an embodiment of the invention.

FIG. 3 illustrates a block diagram 300 of the processing system 130, in accordance with some embodiments of the invention. As illustrated in FIG. 3, the processing system 130 may include a communication device 344, a processing device 342, and a memory device 350 having an authentication application/module 353, a processing system application 354 and a processing system datastore 355 stored therein. As shown, the processing device 342 is operatively connected to and is configured to control and cause the communication device 344, and the memory device 350 to perform one or more functions. Furthermore, the processing device 342 is typically configured to control and cause the processing device 210 of the computer terminal 120, the sensor devices 112, and visual capture devices 114, to perform one or more functions. In some embodiments, the authentication application 353 and/or the processing system application 354 comprises computer readable instructions that when executed by the processing device 342 cause the processing device 342 to perform one or more functions and/or transmit control instructions to the computer terminal 120, the authentication database 118, the third party system 116, the sensor devices 112, and visual capture devices 114, and/or the communication device 344. It will be understood that the authentication application 353 and/or the processing system application 354 may be executable to initiate, perform, complete, and/or facilitate one or more portions of any embodiments described and/or contemplated herein, and specifically embodiments directed to user activities. The authentication application 353 may comprise executable instructions associated with one or more authentication steps of user activities, and may be embodied within the processing system application 354 in some instances. In some embodiments, the authentication application 353 is similar to the authentication module 234 described previously. The processing system 130 may be owned by, operated by and/or affiliated with financial institutions or other entities. Although some embodiments of the invention herein are generally described as involving a "financial institution," one of ordinary skill in the art will appreciate that other embodiments of the invention may involve other businesses that take the place of or work in conjunction with the financial institution to perform one or more of the processes or steps described herein as being performed by a financial institution. Still in other embodiments of the invention the financial institution described herein may be replaced with other types of businesses that may provide payment accounts for transactions. In accordance with embodiments of the invention, the term "financial institution" refers to any organization in the business of moving, investing, or lending money, dealing in financial instruments, or providing financial services. This includes commercial banks, thrifts, federal and state savings banks, savings and loan associations, credit unions, investment companies, merchants, insurance companies and the like.

The communication device 344 may generally include a modem, server, transceiver, and/or other devices for communicating with other devices on the network 101. The network communication device 344 may be a communication interface having one or more communication devices configured to communicate with one or more other devices on the network 101, such as the processing system 130, the sensor devices 112, and visual capture devices 114, other processing systems, data systems, etc.

Additionally, referring to processing system 130 illustrated in FIG. 3, the processing device 342 may generally refer to a device or combination of devices having circuitry used for implementing the communication and/or logic functions of the processing system 130. For example, the processing device 342 may include a control unit, a digital signal processor device, a microprocessor device, and various analog-to-digital converters, digital-to-analog converters, and other support circuits and/or combinations of the foregoing. Control and signal processing functions of the system 130 may be allocated between these processing devices according to their respective capabilities. The processing device 342 may further include functionality to operate one or more software programs based on computer-executable program code 352 thereof, which may be stored in a memory device 350, such as the processing system application 354 and the authentication application 353. As the phrase is used herein, a processing device may be "configured to" perform a certain function in a variety of ways, including, for example, by having one or more general-purpose circuits perform the function by executing particular computer-executable program code embodied in computer-readable medium, and/or by having one or more application-specific circuits perform the function. The processing device 342 may be configured to use the network communication interface of the communication device 344 to transmit and/or receive data and/or commands to and/or from the other devices/systems connected to the network 101.

Furthermore, a "user interface" (not illustrated) may be associated with the processing system 130 and may generally include a plurality of interface devices and/or software that allow a user to input commands and data to direct the processing device to execute instructions. For example, the user interface may include a graphical user interface (GUI) or an interface to input computer-executable instructions that direct the processing device to carry out specific functions. The user interface may employ certain input and output devices to input data received from the user 102 or output data to the user 102. These input and output devices may include a display, mouse, keyboard, button, touchpad, touch screen, microphone, speaker, light, joystick, switch, and/or other customer input/output device for communicating with one or more customers. In some embodiments, the user interface may be provided externally to the processing system, for example on one or more workstations connected to the system 130, the user device 104 or the display device 280 of the computer terminal 120. As another example, the user interface may be provided on the computer terminal 120 that may be controlled by the processing system 130 either directly or via the processing device 210 of the computer terminal 120.

The memory device 350 within the processing system 130 may generally refer to a device or combination of devices that store one or more forms of computer-readable media for storing data and/or computer-executable program code/instructions. For example, the memory device 350 may include any computer memory that provides an actual or virtual space to temporarily or permanently store data and/or commands provided to the processing device 342 when it carries out its functions described herein. The processing system 130 may be used by a third party/entity 116 to interact with the computer terminal 120, based on providing requisite authorization. The processing system 130 may further comprise a user data repository 356 comprising user authentication data 357 and user account data 358. The processing system 130 may utilize the authentication data 357 to validate user authentication credentials. Furthermore, the account data 358 may reflect the current account data of the user.

Figure 4:
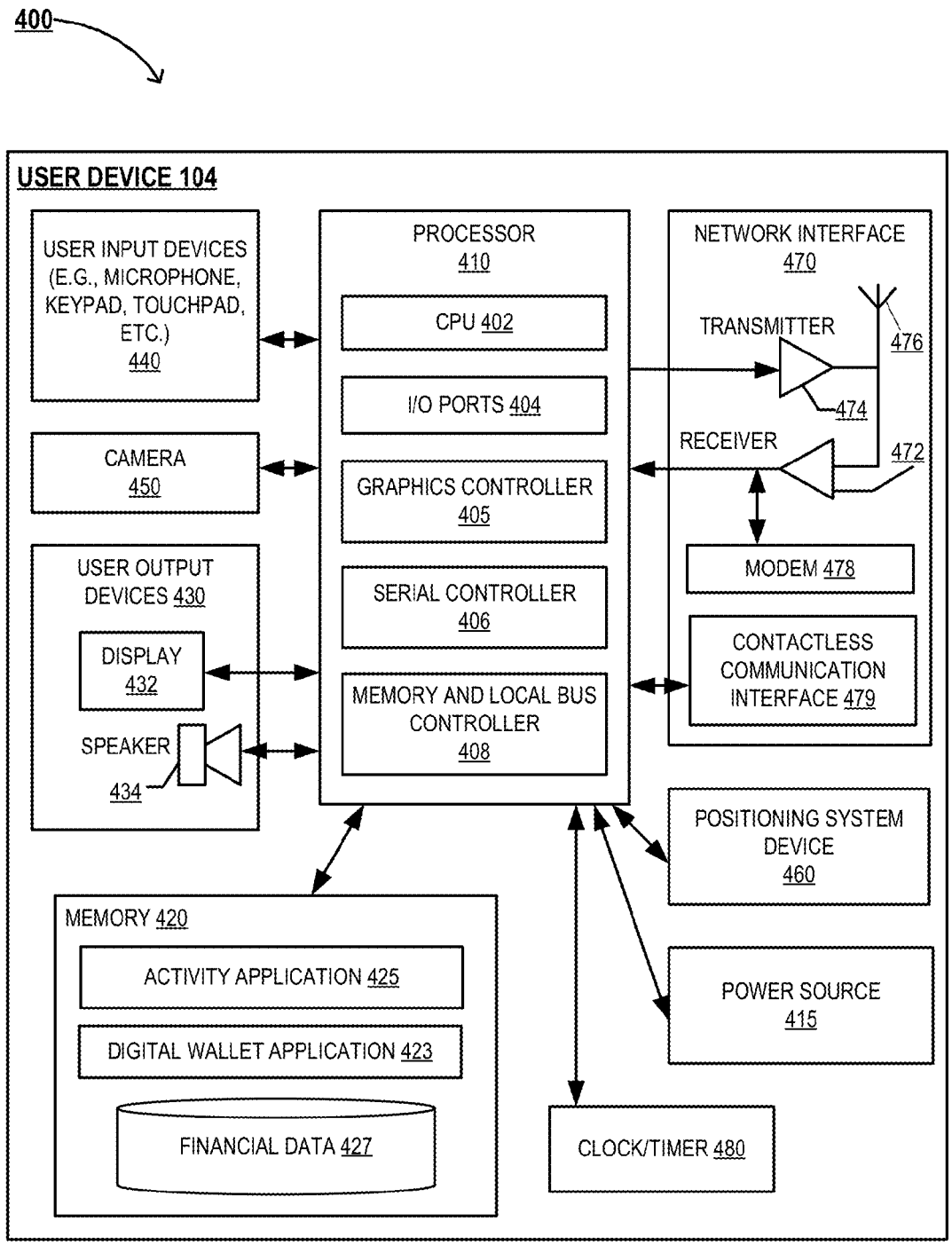
FIG. 4 illustrates a block diagram 400 of a user device, in accordance with an embodiment of the invention.

FIG. 4 illustrates a block diagram 400 of the user device 104, such as a user mobile device, in accordance with some embodiments of the invention. A "mobile device" 104 may be any mobile communication device, such as a cellular telecommunications device (i.e., a cell phone or mobile phone), personal digital assistant (PDA), a mobile Internet accessing device, or another mobile device including, but not limited to portable digital assistants (PDAs), pagers, mobile televisions, gaming devices, laptop computers, cameras, video recorders, audio/video player, radio, GPS devices, any combination of the aforementioned devices.

The mobile device 104 may generally include a processing device or processor 410 communicably coupled to devices such as, a memory device 420, user output devices 430 (for example, a user display device 432, or a speaker 434), user input devices 440 (such as a microphone, keypad, touchpad, touch screen, and the like), a communication device or network interface device 470, a power source 415, a clock or other timer 480, a visual capture device such as a camera 450, a positioning system device 460, such as a geo-positioning system device like a GPS device, an accelerometer, and the like, one or more chips, and the like. The processor 410 may further include a central processing unit 402, input/output (I/O) port controllers 404, a graphics controller 405, a serial bus controller 406 and a memory and local bus controller 408.

The processor 410 may include functionality to operate one or more software programs or applications, which may be stored in the memory device 420. For example, the processor 410 may be capable of operating applications such as the activity application 425, a digital wallet application 423, or a web browser application. The activity application 425 may then allow the mobile device 104 to transmit and receive data and instructions from the computer terminal 120 (for example, via wireless communication or NFC channels), data and instructions from the processing system 130, web content, such as, for example, location-based content and/or other web page content, according to a Wireless Application Protocol (WAP), Hypertext Transfer Protocol (HTTP), and/or the like.

The digital wallet application 423 and the financial data module 427, together may include the necessary circuitry to provide token storage and transmission functionality, transmitter device signal encoding and decoding functionality to the mobile device 104, for secure transmission of financial and authentication credential tokens via the contactless communication interface 479 to the computer terminal 120. Generally, the financial data module 427 may be a chip in the form of an integrated circuit, a microprocessor, a system-on-a-chip, a microcontroller, or the like. Of note, while FIG. 4 illustrates the financial data module 427 as an element within the mobile device 104, it will be apparent to those skilled in the art that the financial data module 427 functionality may be incorporated separately, within other elements in the mobile device 104, or may be included in a removable storage device such as an SD card or the like.

The processor 410 may be configured to use the network interface device 470 to communicate with one or more other devices on a network 101 such as, but not limited to the computer terminal 120 and the processing system 130. In this regard, the network interface device 470 may include an antenna 476 operatively coupled to a transmitter 474 and a receiver 472 (together a "transceiver"), modem 478 and a contactless communication interface 479. The processor 410 may be configured to provide signals to and receive signals from the transmitter 474 and receiver 472, respectively. The signals may include signaling information in accordance with the air interface standard of the applicable BLE standard, cellular system of the wireless telephone network and the like, that may be part of the network 101. In this regard, the mobile device 104 may be configured to operate with one or more air interface standards, communication protocols, modulation types, and access types. By way of illustration, the mobile device 104 may be configured to operate in accordance with any of a number of first, second, third, and/or fourth-generation communication protocols and/or the like. For example, the mobile device 104 may be configured to operate in accordance with second-generation (2G) wireless communication protocols IS-136 (time division multiple access (TDMA)), GSM (global system for mobile communication), and/or IS-95 (code division multiple access (CDMA)), or with third-generation (3G) wireless communication protocols, such as Universal Mobile Telecommunications System (UMTS), CDMA2000, wideband CDMA (WCDMA) and/or time division-synchronous CDMA (TD-SCDMA), with fourth-generation (4G) wireless communication protocols, and/or the like. The mobile device 104 may also be configured to operate in accordance with non-cellular communication mechanisms, such as via a wireless local area network (WLAN) or other communication/data networks. The mobile device 104 may also be configured to operate in accordance Bluetooth® low energy, audio frequency, ultrasound frequency, or other communication/data networks.

The network interface device 470 or communication device 470 may also include a user activity interface presented in user output devices 430 in order to allow a user 102 to execute some or all of processes described herein. The application interface may have access to the hardware, for example, the transceiver, and software previously described with respect to the network interface device 470. Furthermore, the application interface may have the ability to connect to and communicate with an external data storage on a separate system within the network 101. As described above, the mobile device 104 includes a display device 432 having a user interface that includes user output devices 430 and/or user input devices 440. The user output devices 430 may include a display 432 (e.g., a liquid crystal display (LCD) or the like) and a speaker 434 or other audio device, which are operatively coupled to the processor 410. The user input devices 440, which may allow the mobile device 104 to receive data from the user 102, may include any of a number of devices allowing the mobile device 104 to receive data from a user 102, such as a keypad, keyboard, touch-screen, touchpad, microphone, mouse, joystick, other pointer device, button, soft key, and/or other input device(s).

The mobile device 104 may further include a power source 415. Generally, the power source 415 is a device that supplies electrical energy to an electrical load. In some embodiment, power source 415 may convert a form of energy such as solar energy, chemical energy, mechanical energy, and the like, to electrical energy. Generally, the power source 415 in a mobile device 104 may be a battery, such as a lithium battery, a nickel-metal hydride battery, or the like, that is used for powering various circuits, for example, the transceiver circuit, and other devices that are used to operate the mobile device 104. Alternatively, the power source 415 may be a power adapter that can connect a power supply from a power outlet to the mobile device 104. In such embodiments, a power adapter may be classified as a power source "in" the mobile device 104.

The mobile device 104 may also include a memory buffer, cache memory or temporary memory device operatively coupled to the processor 410. Typically, one or more applications 425 and 423, are loaded into the temporarily memory during use. As used herein, memory may include any computer readable medium configured to store data, code, or other information. The memory device 420 may include volatile memory, such as volatile Random Access Memory (RAM) including a cache area for the temporary storage of data. The memory device 420 may also include non-volatile memory, which can be embedded and/or may be removable. The non-volatile memory may additionally or alternatively include an electrically erasable programmable read-only memory (EEPROM), flash memory or the like.

In some instances, various features and functions of the invention are described herein with respect to a "system." In some instances, the system may refer to the computer terminal 120 performing one or more steps described herein in conjunction with other devices and systems, either automatically based on executing computer readable instructions of the memory device 230, or in response to receiving control instructions from the processing system 103. In some instances, the system refers to the processing system 103. In some instances, the system refers to the devices and systems on the network environment 100 of FIG. 1.

Figure 5:
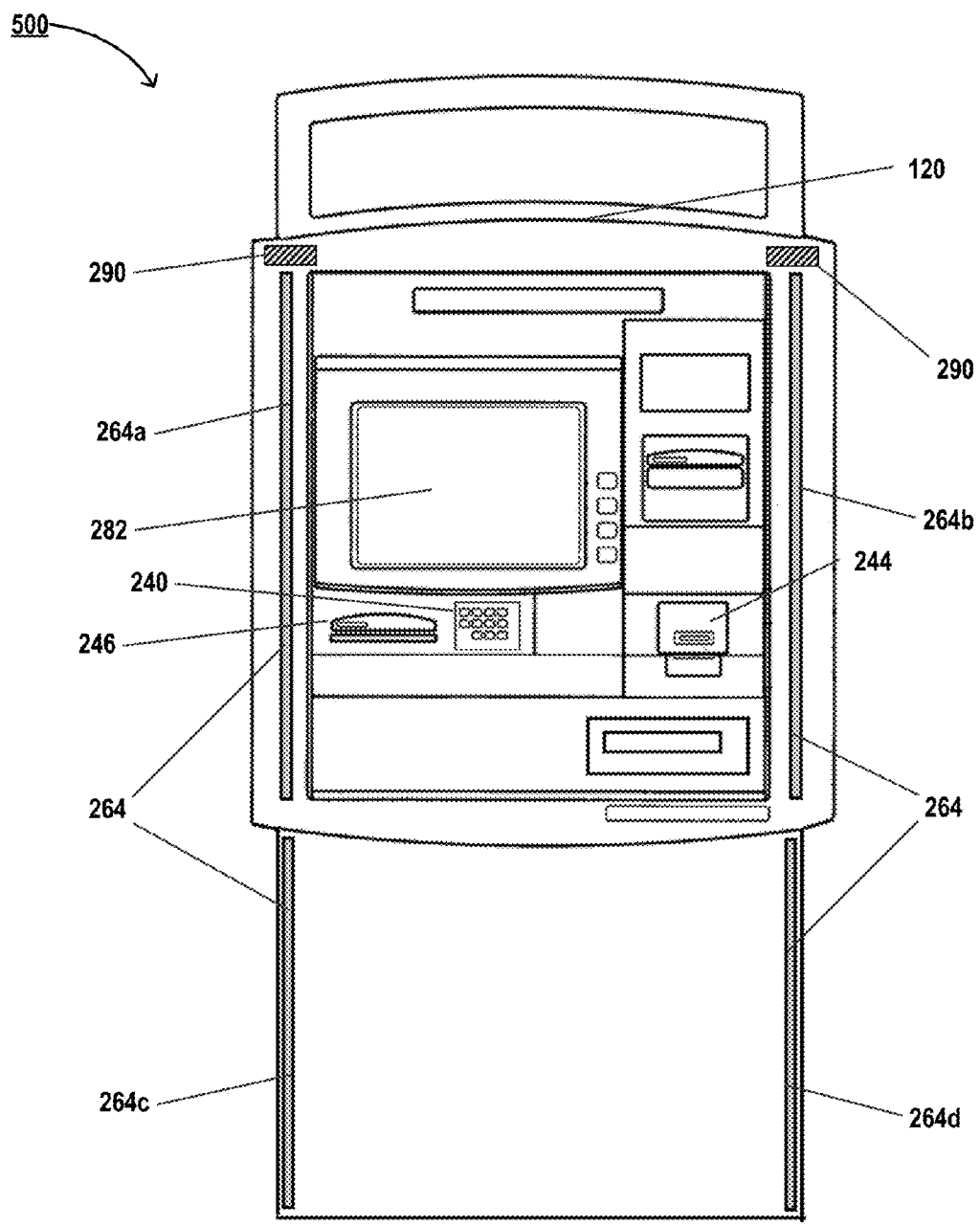
FIG. 5 illustrates a front view 500 of a computer terminal environment, in accordance with an embodiment of the invention.

FIG. 5 illustrates a front view 500 of a computer terminal environment, in accordance with one embodiment of the computer terminal 120. The functions and features of the computer terminal illustrated herein is similar to those described with respect to FIG. 2. Specifically, FIG. 5 illustrates the computer terminal 120 equipped with the privacy module comprising one or more retractable privacy barriers 264 operatively coupled to and controlled by one or more actuator devices (not shown). The retractable privacy barriers 264 (264a, 264b, 264c and 264d) are suitably positioned and oriented on the computer terminal 120 such that extension of retractable privacy barriers 264 is configured to reduce viewability of the computer terminal 120. Although FIG. 5 illustrates the computer terminal 120 having retractable privacy barriers 264a, 264b, 264c and 264d, it is understood that more or fewer barriers may be employed. The size, shape, position, orientation, and length of extension of the retractable privacy barriers 264 are typically configured such that viewability and/or visibility of a predetermined portion/area of the computer terminal 120 and/or a predetermined portion of the user at the terminal is reduced when viewed through the extended retractable privacy barriers 264 from a predetermined location in the vicinity of the terminal 120. The computer terminal 120 further comprises the display 280 configured to present a user interface for an interactive session with the user 102. The computer terminal further comprises user input devices 240, card readers 244, currency dispensers 246 and other components for facilitating the interactive session. The computer terminal may further comprise sensor devices 290.

Figure 6:
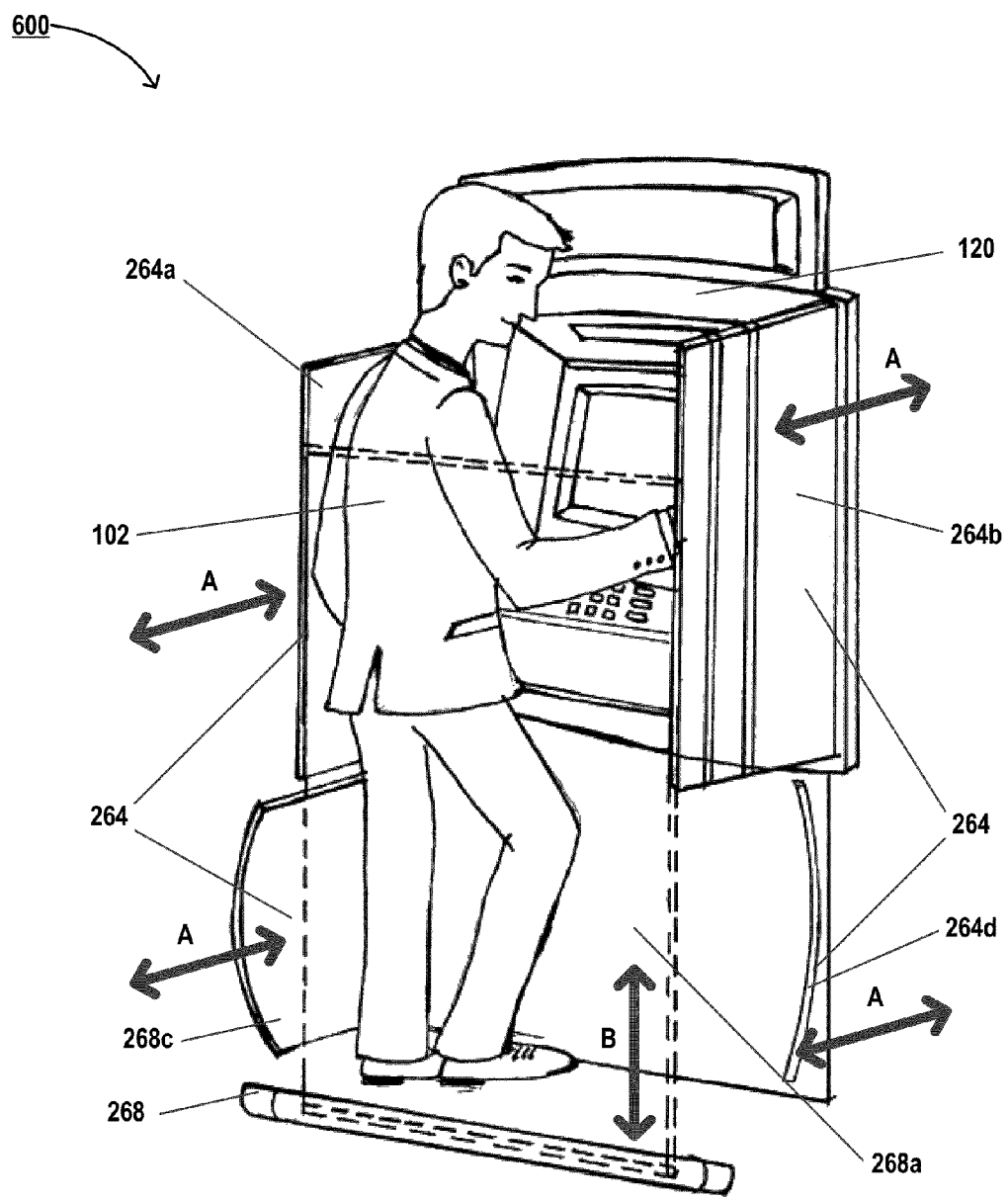
FIG. 6 illustrates a perspective view 600 of a computer terminal environment, in accordance with an embodiment of the invention.

FIG. 6 illustrates a perspective view 600 of a computer terminal environment, in accordance with one embodiment of the computer terminal 120. The functions and features of the computer terminal illustrated herein are similar to those described with respect to FIG. 2 and FIG. 5. Specifically, FIG. 6 illustrates a user 102 performing a user activity at the computer terminal 120. FIG. 6 further illustrates the computer terminal 120 having retractable privacy barriers 264 (264a, 264b, 264c and 264d). As discussed previously, the computer terminal 120 (via the processor 210 and the actuators 262) may extend the retractable privacy barriers 264 suitably to reduce the viewability of the computer terminal by other individuals in the vicinity of the computer terminal 120. FIG. 6 illustrates an exemplary instance of extension of the retractable privacy barriers 264 along a direction A, based on identifying one or more triggers.

The triggers may comprise identifying that another individual is near the terminal 120. In this regard, the system may determine that another individual is located within a predetermined distance of the terminal 120, determine that another individual has been located at within the predetermined distance of the terminal for a predetermined length of time, determine that another individual has been stationary for a predetermined length of time, and the like. The triggers may also comprise determining that the user is seeking to perform or currently performing a predetermined user activity. For example, the system may extend one or more barriers, automatically, based on determining, either at the initiation of the interactive session or during the session, that the user is seeking to withdraw currency from the terminal 120. The triggers may also comprise determining that a predetermined portion or component of the terminal 120 is being utilized or is likely to be utilized for the user activity being conducted by the user. For example, based on determining that a determined user activity involves providing credentials using a keypad, the system may extend barriers to reduce viewability of the keypad. Furthermore, the triggers may comprise environmental triggers such as real-time news feeds, determining a predetermined type of incident within a predetermined distance of terminal 120, determining a predetermined environmental parameter or a weather event, and the like.

As illustrated by FIG. 6, the system (terminal 120) may extend the barrier 264a to a first length L1 along the direction A, based on a first trigger event (such as, identifying presence of another individual at a first location in the vicinity of the terminal, for example, towards the left side of the user 102). The system may extend the barrier 264b to a second length L2 along the direction A based on determining user activity parameters (for example, determining that the user 102 is likely to utilize one or more portions of the terminal 120 that are adjacent to the barrier 264b, such as a card reader 244 (illustrated in FIG. 5)). The retractable privacy barriers 264c and 264d may also be suitably extended to lengths L3 and L4, respectively. In the illustration of FIG. 6, barrier 264d is illustrated in its retracted state.

In addition, the system may extend one or more external retractable privacy barriers 268a that are located external to and/or away from the terminal 120. These external barriers 268a may be substantially similar to the retractable privacy barriers 264 described previously. For example, based on determining that an individual is located behind the user 102, the system may transmit control signals to an external barrier apparatus 268 having one or more actuators (not illustrated) and an external retractable privacy barrier 268a, to extend the barrier 268a to a fifth length L5 along a direction B. In some instances, for example based on determining an environmental trigger such as a predetermined type of incident within a predetermined distance of terminal 120, or a predetermined environmental parameter or a weather event, the system may vary individually the lengths of extensions L1-L5 (not illustrated) such that the user 102 is effectively/substantially enclosed by the barriers 264a-d and 268a and the front of the terminal 120.

A trigger is typically identified using "sensors," hereinafter referring to the sensor devices 290 of the terminal 120 and/or sensor devices 112 and visual capture devices 114 in the environment (illustrated in FIGS. 1, 2, 5 and 7). The sensors may identify one or more triggers, in real time (for example, presence of another individual within a predetermined distance of the terminal 120), and transmit a first response signal to the system. Consequently, the system may suitably extend one or more retractable privacy barriers 264 based on the trigger identified by the sensors. In addition, in some instances, based on receiving a second response signal from the sensors indicating that the trigger is no longer active (for example, determining that the individual is no longer within a predetermined distance of the terminal 120), the system may retract the one or more barriers. The system may receive response signals from the sensors, continuously, periodically (for example, with a predetermined time interval of 2 seconds, 5 seconds, 10 seconds, and the like), and/or intermittently (for example, the response signal may be transmitted only in the event of determining a trigger). Furthermore, the response signals themselves may be configured to indicate the presence of a trigger and/or the system may determine the trigger based on analyzing the response signal. For example, the response signal may be transmitted by a proximity sensor based on determining a predetermined trigger, such as detecting the presence of an individual at a predetermined distance from the terminal 120, or by an environment sensor detecting environmental parameters/triggers and the like. As another example, the response signal may be transmitted by the sensors to the system, and subsequently the system may analyze the response signal to determine whether a trigger event has occurred.

In some embodiments, the sensors are active sensors and are configured to identify one or more triggers constantly and in real time. Furthermore, the sensors may actively monitor the surroundings and be configured to transmit a response signal, typically in real-time, to the system.

In some embodiments, the sensors are passive sensors, and are activated, deactivated and otherwise controlled by the system. Here, the system may transmit control signals to activate one or more sensors based on determining onset triggers. In response to determining a onset triggers (for example, determining that the user is at the terminal 120), the system may then transmit, in real time, control signals to one or more sensors, the control signals being configured to activate and/or switch the sensors to an active state. Subsequently, in response to determining that the onset trigger is no longer active or have changed (for example, determining that the user is no longer at the terminal 120), the system may transmit control signals to deactivate or switch the sensors to a passive state. Thereby, the efficiency of the sensors is improved and the power required for operating the sensors is greatly reduced since the sensors are only activated when required (for example, when the user is conducting an interactive session). Furthermore, processing speeds of the system and/or the sensors is enhanced, since processing resources need not be allocated for continuously analyzing response signals from the sensors, even when onset triggers are not active. Determining onset triggers typically comprise determining that the user 102 is within a predetermined distance from the terminal 120, determining that the user 102 seeks to initiate a user activity at the terminal 120 (for example, based on the user interacting with user input devices of the terminal 120), determining that the user 102 is currently conducting an interactive session with the terminal 120, determining that the user 102 is currently performing a predetermined user activity at the terminal 120 and the like. In response to determining the onset triggers, the system may then transmit, in real time, control signals to one or more sensors, the control signals being configured to activate and/or switch the sensors to an active state. The sensors may then identify one or more triggers, in real time (for example, presence of another individual), and transmit a response signal to the system. Consequently, the system may suitably extend one or more retractable privacy barriers 264 based on the trigger identified by the sensors. In addition, based on receiving a response signal from the sensors indicating that the trigger is no longer active or has changed, the system may retract the barrier or otherwise vary the extension. In some embodiments, the system may extended one or more retractable privacy barriers, in response to identifying one or more onset triggers.

In some embodiments, a combination of active and passive sensors may be utilized. For example, an active sensor may be utilized to determine an onset trigger, and passive sensors may be activated accordingly. For example, the system may identify an onset trigger of the presence of the user within a distance of 2 feet from the front of the terminal 120, based on analyzing a response signal of a real time video stream from an active sensor of a visual/image capture devices. The system may then suitably activate other passive proximity and position sensors to determine the presence of individuals around the terminal 120, only when the user is performing a user activity/and interactive session.

Figure 7:
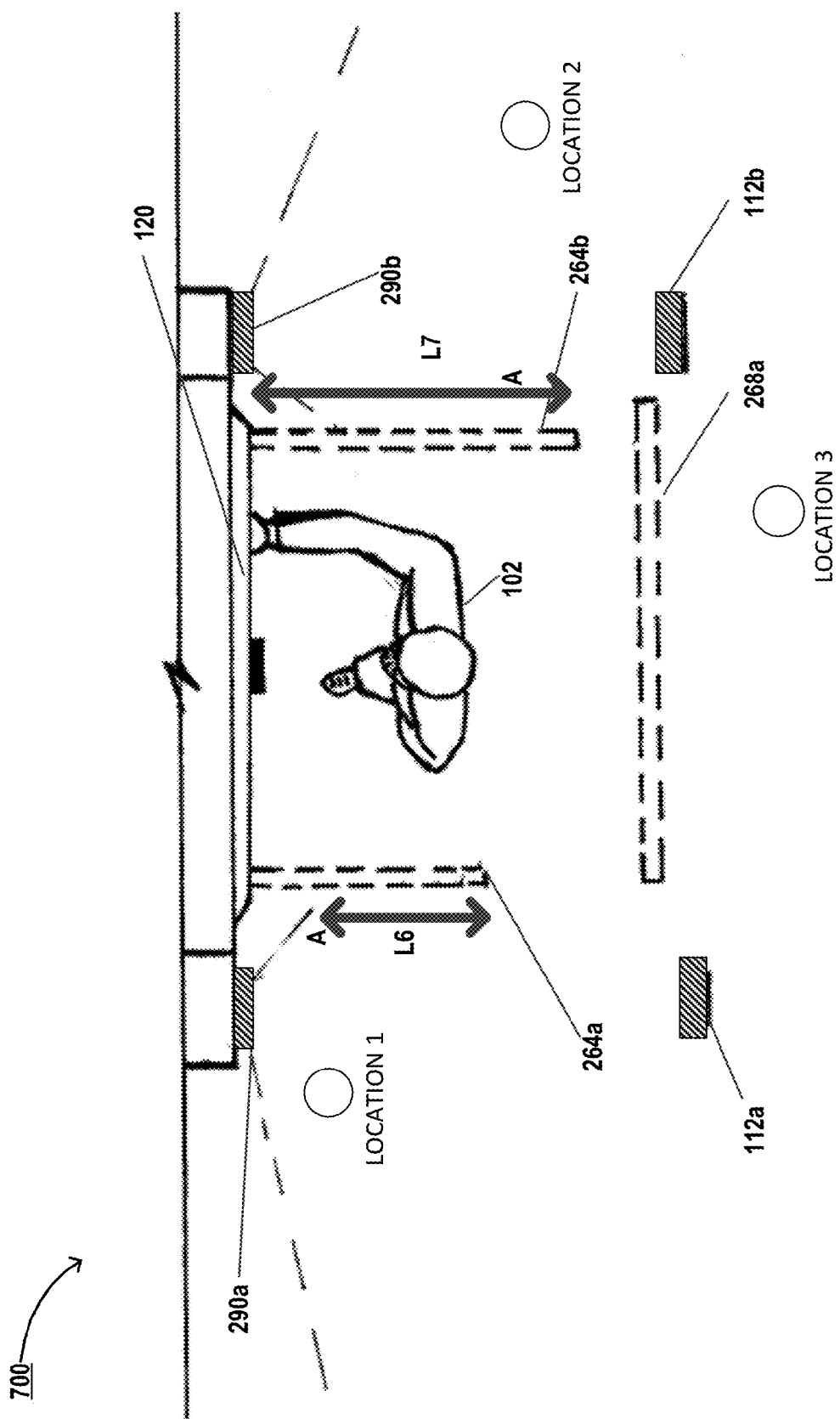
FIG. 7 illustrates a top side view 700 of a computer terminal environment, in accordance with an embodiment of the invention.

FIG. 7 illustrates a top side view 700 of a computer terminal environment, in accordance with one embodiment of the computer terminal 120. The functions and features of the computer terminal illustrated herein are similar to those described with respect to FIGS. 2, 5 and 6. Specifically, FIG. 7 illustrates a user 102 performing a user activity at the computer and retractable privacy barriers 264a and 264b of the terminal 120 and external retractable privacy barrier 268a being extended. As discussed previously, the computer terminal 120 (via the processor 210 and the actuators 262) may extend the retractable privacy barriers 264 suitably to reduce the viewability of the computer terminal by other individuals in the vicinity of the computer terminal 120. The sensors (112a, 112b) may be active sensors that are configured to determine onset triggers. For example, the sensors (112a, 112b) may identify that the user 102 has passed through between them and is located within a predetermined distance of the terminal 120. In response, the system may activate passive sensors 290a and 290b of the terminal 120, to determine trigger events. For example, the based on a response signal from the sensor 290a, the system may determine that an individual is located at Location 1 within a predetermined distance of the terminal 120. In response, the system may extend the barrier 264a to a sixth length L6 along a direction A. The system may then extend the barrier 264b to a seventh length L7 along the direction A based on determining, via the sensor 290b, that another individual has been located at a location 2 for a predetermined period of time. The seventh length L7 may be greater than the sixth length L6, due to the relative positions of Locations 1 and 2 and to ensure that barriers reduce the viewability of the terminal 120 for individuals at each of the locations. In this regard, the system may determine a range of view from each of the locations, and extend the barriers to ensure that the terminal is blocked in the range of view of each location. In addition, the system may extend an external retractable privacy barrier 268a based on determining that an individual is located at a location L3 behind the user 102. That said, it is understood that the system may gauge or control the extension of the barriers based on detecting any obstructions in their paths.

Furthermore, the features and functions of the system, sensors and barriers described herein are also applicable in the instances where the user is mounted on a motor cycle. The one or more barriers 264 may be similarly extended around the user and the motorcycle, to reduce the visibility of the display of the computer terminal 120.

Figure 8A:
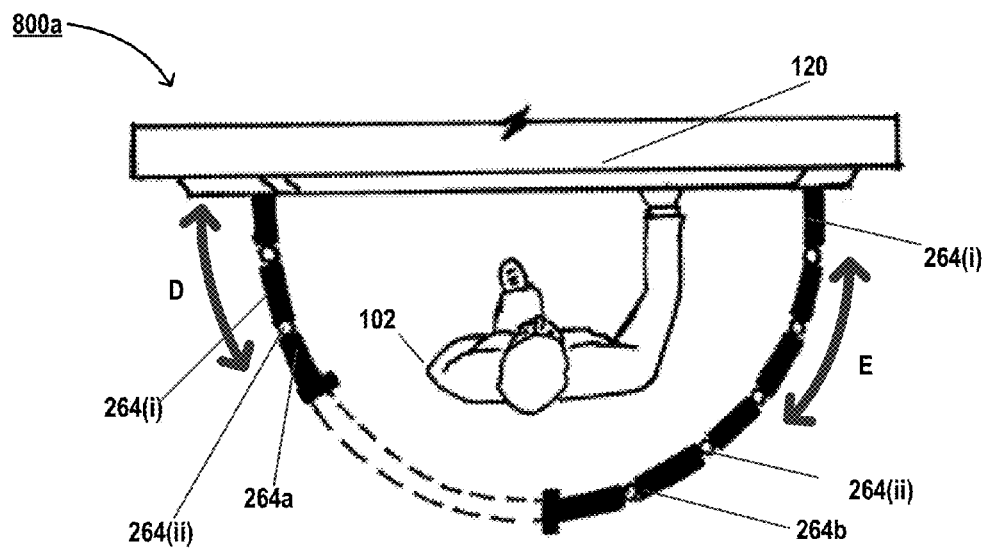
FIG. 8A illustrates a top side view 800a of a computer terminal environment, in accordance with an embodiment of the invention.
Figure 8B:
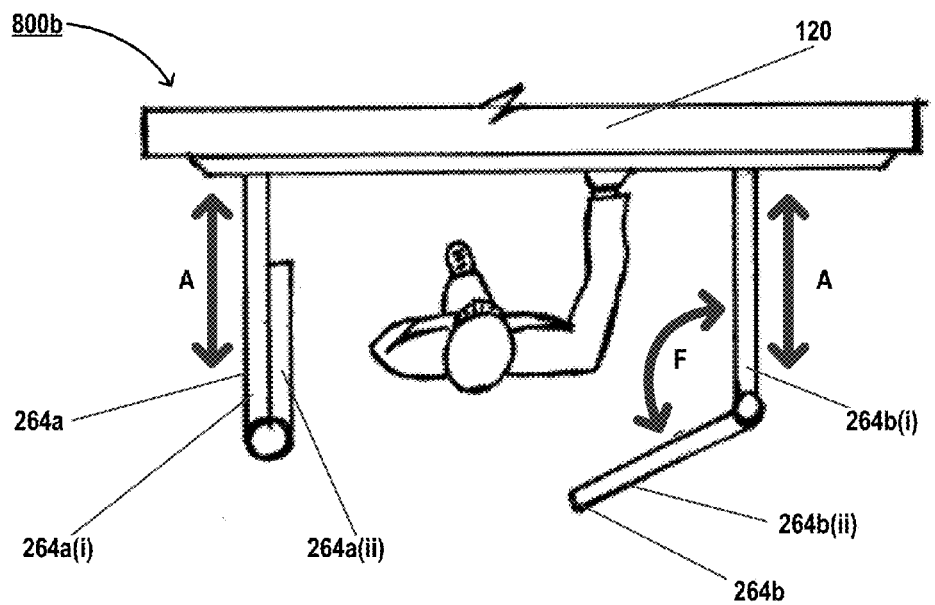
FIG. 8B illustrates a top side view 800b of a computer terminal environment, in accordance with an embodiment of the invention.

FIGS. 8A and 8B illustrate top side views 800a and 800b, respectively, of a computer terminal environments, in accordance with some embodiment of the computer terminal 120. The functions and features of the computer terminal illustrated herein are similar to those described with respect to FIGS. 2, and 5-7. Specifically, FIGS. 8A and 8B illustrate embodiments of the retractable privacy barriers 264a and 264b. FIG. 8A illustrates barriers 264a and 264b with curvilinear paths. In some embodiments, the barriers 264a and 264b are curved, while in other embodiments, individual components of the barriers 264(i) are separately and suitably rotated by the actuators, using hinge arrangements 264(ii), to achieve the curved contour and/or curvilinear extension paths of the barriers 264a and 264b. As illustrated, the barrier 264a may be extended along a path D, while the barrier 264b may be extended along a path E. In some instances, the barriers 264a and 264b may be completely extended such that the user 102 is substantially enclosed by the retractable privacy barriers 264a and 264b and the terminal 120. In some instances, the barriers 264a and 264b may be completely extended such that the user 102 is completely enclosed by the retractable privacy barriers 264a and 264b and the terminal 120, as illustrated by the dashed lines. In some embodiments, the barriers 264a and 264b may be completely extended such that the user 102 is enclosed by the retractable privacy barriers such that there is a predetermined distance between the barriers and the user. Here, the predetermined distance between the barriers and the user may be determined based on user preferences, based on identifying user mobility (for example, extending the barrier enclosure area to accommodate a wheelchair of the user based on the received signals from sensor devices), based on determining/detecting user physical proportions, and the like. In some instances, the barriers 264a and 264b may be extended such that only the user 102 is enclosed by the retractable privacy barriers. In this regard, the system may extend the barriers 264 (illustrated in FIGS. 6 to 8), based on determining, using the sensor devices, that only the user 102 is located within the enclosure area of the barriers 264. Furthermore, based on determining another individual along with the user 102 in the enclosure area, the system may display a warning or an alert. Here, the system may then extend the barriers only after determining that the individual has exited the enclosure area where the user is currently located and/or after receiving instructions from the user.

FIG. 8B illustrates retractable privacy barriers 264a and 264b with a combination of multiple extension paths. For example, the barriers (264a, 264b) may comprise both linear (A) and angular (F) extension paths. As illustrated by FIG. 8B, the barriers (264a, 264b) each comprise multiple components, with the barrier 264a having components 264a(i) and 264a(ii), and the barrier 264b having components 264b(i) and 264b(ii). The components (264a(i), 264b(i)) are configured to be actuated linearly, while the components (264a(ii), 264b(ii)) are configured to be actuated angularly. For example, for extending the barriers (264a, 264b), the components (264a(i), 264b(i)) are extended linearly, causing linear displacement of the both the linear (264a(i), 264b(i)) and angular path components (264a(ii), 264b(ii)), along direction A. In addition, the components (264a(ii), 264b(ii)) may be actuated along an angular path (F), to achieve a composite travel path of a combination of A and F, as illustrated with respect to barrier 264b.

As alluded to previously, the computer terminal 120 is also typically configured to monitor parameters of the environment in which the computer terminal is located (for example, using the sensors or by retrieving real-time information from other systems and devices). Information about the environment (e.g., a real-time diagram of the environment immediately proximate to the computer terminal) and determined environmental triggers may be displayed on the display 280 of the computer terminal 120. By providing environmental information on the computer terminal's display 280, the user may maintain awareness of their surroundings and be aware of environmental triggers even while focusing attention on the computer terminal's display.

Figure 9:
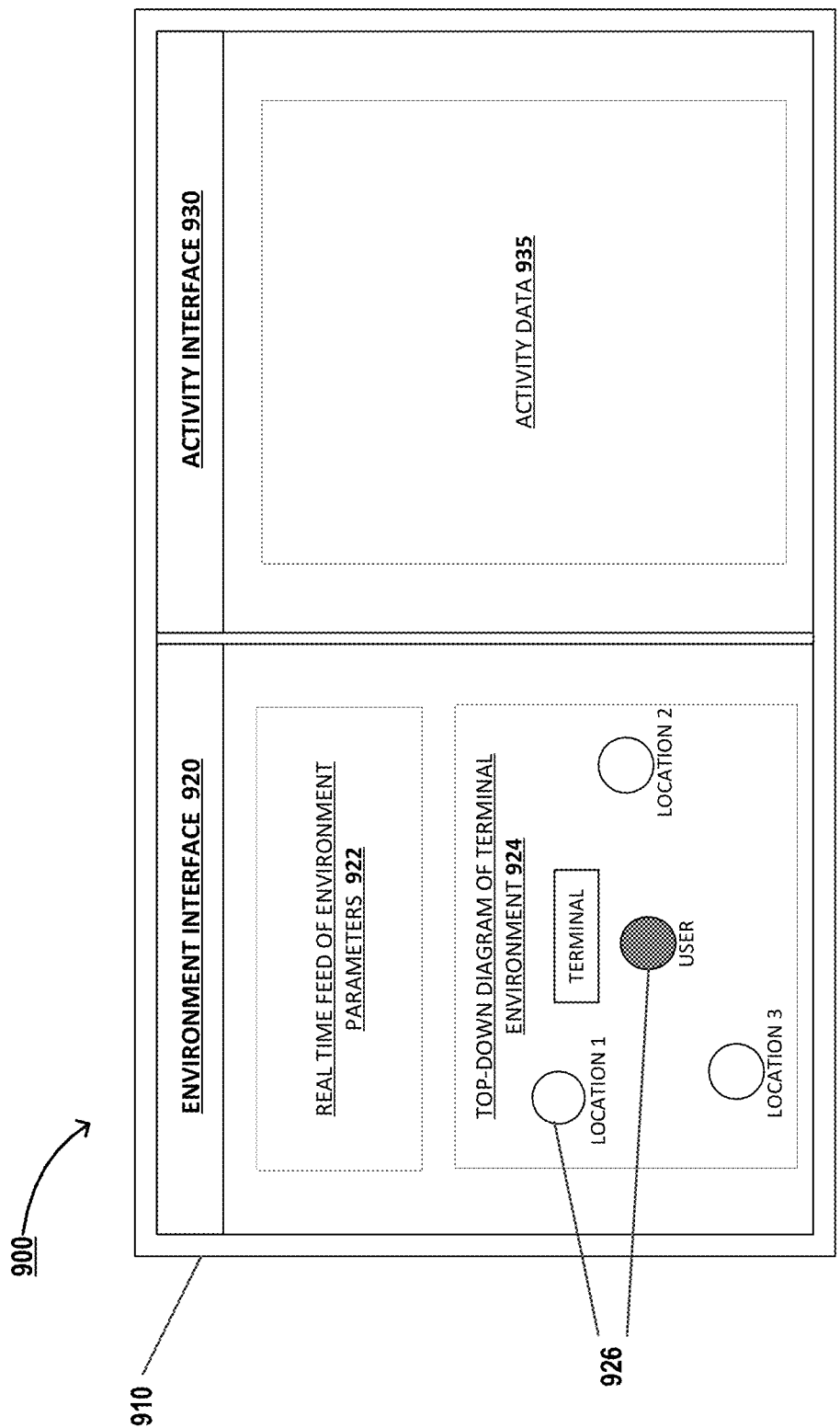
FIG. 9 illustrates an integrated interactive graphical user interface 900, in accordance with an embodiment of the invention.

FIG. 9 illustrates, an integrated interactive user interface 900 (also referred to as a "graphical user interface 900"), which is configured to be presented on the display 280 of the computer terminal 120, in accordance with one embodiment of the invention. However, the integrated interactive user interface 900 may also be presented on other devices such as screens of the retractable privacy barriers, interface headset or a display of the user device, and the like. The integrated interactive user interface 900 is typically a composite interface, which is created by the system by embedding elements and functionality associated with the user activity being performed and environment parameters into a single interactive interface. Specifically, the integrated interactive user interface 900 comprises an activity interface 930 associated with the user activity being performed and an environment interface 920 associated with environment parameters and triggers, integrated into a single interface. The activity interface 930 typically comprises activity data and functional graphical elements 935 associated with the user activity.

The environment interface 920 typically comprises a real time feed of environment parameters 922. In some embodiments, the real time feed of environment parameters 922 comprises audio-visual information from the surroundings of the terminal, or a predetermined locality of the terminal, captured in real-time. In some embodiments, the real time feed of environment parameters 922 comprises real-time news feeds retrieved from other systems, such as the processing system 130 and third party system 113, display of determined triggers, and the like. In some embodiments, the system may display information associated with the determined triggers, for example, as pop-up alerts within the environment interface 920/the graphical user interface, or within the real-time feed 922. For example, the system may display information associated with a trigger of determining presence of an individual at a predetermined distance from the terminal 120, or an environmental trigger based on detecting environmental parameter or receiving information about an incident in the locality and the like.

In addition, in some embodiments, the environment interface 920 may further comprise a top-down diagram of the terminal environment 924, indicating the relative positions of the terminal, user, any extended barriers, and one or more individuals present at one or more locations around the terminal. In this way, the user is able to effectively gauge the surroundings, while also being able to perform the user activity. In addition, the user may request extension/retraction of one or more retractable privacy barriers, through the interface 900, based on analyzing the environment interface 920.

As described previously, the system is configured to perform actions, in real-time, or near real-time, after occurrence of an event, such as, determination of a trigger in real-time in the event of an individual being present proximate to the user at the terminal, extension of the retractable privacy barrier in real-time based on a trigger event, display of the real-time news feed or alert in response to events or incidents, and the like. As used herein, real-time or near real-time actions of the system, refer to actions that are performed synchronous with or substantially synchronous with the occurrence of the event. Specifically, in some instances, the system performs a real-time action instantaneously after determining an event. For example, the system may detect the presence of another individual near the user, instantaneously or within 1 or 2 seconds or less, of the event of the individual arriving near the user. In some instances, real-time or near real-time actions are performed substantially synchronous, or within a predetermined time after the occurrence of the event. For example, the system may display an alert associated with an environmental trigger of an incident received from another secondary system. Here, the alert may be displayed within a predetermined time, such as a few seconds or minutes of occurrence of the incident, based on the response time of the secondary system, the time that the incident data was received at the system, time taken to process the data, unavoidable processing and memory times and the like. In some embodiments, the graphical user interface is configured to present one or more offers associated with the locality and/or current location of the user.

Figure 10:
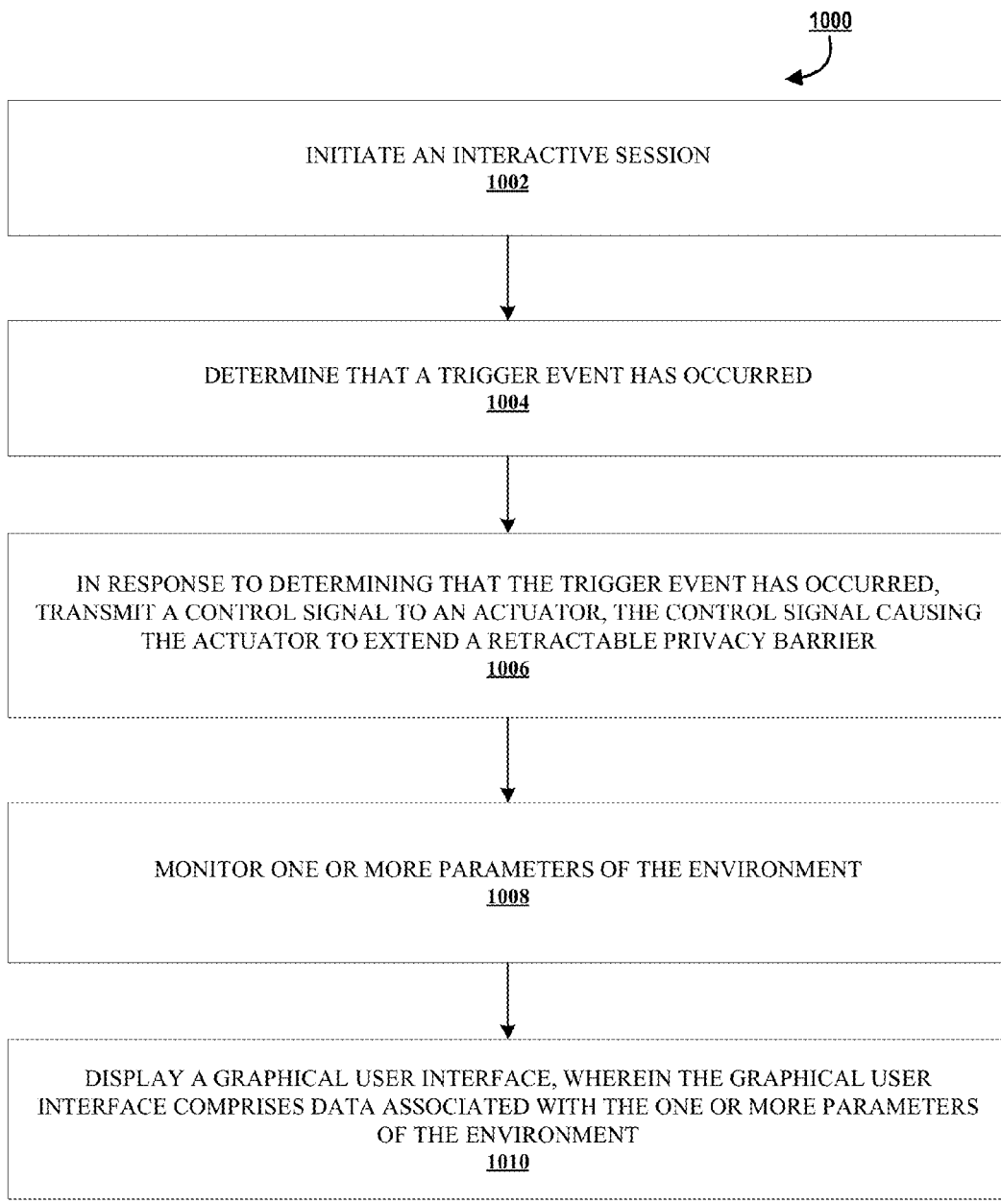
FIG. 10 illustrates a high level process flow 1000 for providing a secure interactive session to a user at a computer terminal, in accordance with an embodiment of the invention.

Referring now to FIG. 10, illustrating a high level process flow 1000 for providing a secure interactive session to a user at a computer terminal. At first, the system initiates an interactive session with the user at the computer terminal 120, as indicated by block 1002. The system typically initiates an interactive session with the user, for example using a display of the computer terminal, to facilitate the performance of one or more user activities at the computer terminal. Typically, the system receives an indication from the user to initiate an interactive session at the terminal 120. In some instances, the system requests authentication credentials from the user, and initiates the interactive session based on successful validation of the authentication credentials.

Next, at block 1004, the process 1000 involves determining that a trigger event has occurred. The feature of determining that a trigger event has occurred is described in detail with respect to FIGS. 6, 7 and 8. For example, in some instances, the one or more sensors are configured to detect a presence of the user at the terminal. Here, determining that a trigger event has occurred comprises detecting, via the one or more sensors, the presence of the user. In response, the system may transmit a control signal to the actuator, to cause extension of the retractable privacy barrier, to a predetermined length.

As another example, the system is configured for monitoring one or more biometric parameters of the user using one or more biometric sensors, as discussed previously. In this regard, the system may identify a trigger event based on determining that one or more biometric parameters of the user exceed a predetermined threshold, such as elevated heart rate exceeding a predetermined threshold value, stress levels exceeding a predetermined threshold, body temperature exceeding a predetermined threshold, predetermined pupil dilation, abnormal speech patterns, user hand/body tremors, and the like. Here, based on the determination of the biometric trigger, the system may identify that a user condition, such as anxiety, fatigue or duress, exists. In some embodiments, based on identifying the user condition, the system may modify, in real time, the parameters of user activities (for example, reducing the withdrawal limit, preventing access to one or more accounts, generating additional alerts and the like). In some instances, modifying the parameters of the user activity comprises modifying the time/duration of the user activity. For example, the system may increase wait time or duration for withdrawal, increase wait time for display of the user interfaces, and the like.

In response to determining that the trigger event has occurred, the system typically transmits a control signal to the actuator, as indicated by block 1006. The control signal is configured to cause the actuator to extend the retractable privacy barrier, as described in detail with respect to FIGS. 5 to 8.

The system is further configured to monitor one or more parameters of the environment, at block 1008. As discussed previously, the system is configured to identify one or more environmental parameters and triggers based on monitoring the environment in which the computer terminal is located. The system may determine these parameters by utilizing one or more sensors, analyzing retrieved data from the processing system, third party system and the like. As such, the system may monitor a first parameter of the one or more environmental parameters, to determine an environmental trigger event comprising a current an environmental condition. In response, the system may transmit a control signal to the actuator, to cause extension of the retractable privacy barrier, to a predetermined length. Furthermore, based on the continued monitoring the first parameter, the system may determine that the environmental condition no longer exists. In response, the system may transmit a control signal to the actuator, to cause retraction of the retractable privacy barrier.

Subsequently, the system may initiate a presentation of an integrated interactive user interface, also referred to as a graphical user interface on the display of the computer terminal, as indicated by block 1010. The graphical user interface typically comprises data associated with the one or more parameters of the environment, as described in detail with respect to FIG. 9. As discussed, in some instances, the sensors are configured to monitor a first parameter of the one or more environmental parameters. The system may then display the data associated with the first parameter on the graphical user interface, for example, the environment interface 920.

In the instances where analyzing the biometric triggers causes the system to determine a user condition of duress or anxiety, the system may further determine that the user activity may be compromised. In response, the system may modify the display of the graphical user interface a predetermined security interface or a mock interface that mimics the look and feel of the graphical user interface. Here, the system typically eschews the display of user financial and activity data in the predetermined security interface and instead presents pseudo content and data, to ensure security of user data. In some embodiments, based on determining the user condition of duress or anxiety, or based on determining a predetermining compromise event, and/or based on detecting unauthorized access, the system may cause the retractable privacy barriers 264 (for example, those illustrated in FIGS. 6 to 8) to be completely enclosed for the protection of the user and/or to preserve the integrity/security of the terminal 120 or the user activity. The system may completely enclose the barriers 264 for a predetermined period of time, for as long as the user condition/unauthorized access is determined to exist and/or until an instruction to at least partially retract the barriers 264 is received (for example, from the user, the processing system 130, and/or another authorized system/entity/personnel).

As such, the graphical user interface comprises real-time data associated with the one or more parameters of the environment. Furthermore, the system is also configured to alert the user via the graphical user interface in the event of an environmental trigger (for example, a predetermined incident in the locality or the vicinity of the terminal, an individual located near the terminal for a predetermined period of time, and the like). The system may alert the user and one or more other systems or authorities, before, after and/or during the user activity. For example, based on determining that an environmental condition exists, the system may display an indicator that the environmental condition exists on the graphical user interface (for example, within the environment interface 920 of the graphic user interface 900). Furthermore, the system is configured for displaying a diagram of at least a portion of the environment adjacent to the computer terminal on the graphical user interface, as indicated by the top-down diagram of the terminal environment 924 of FIG. 9.

In some instances, a security word or phrase may be defined in the system, which automatically triggers presentation of the predetermined security interface or extension of one or more retractable privacy barriers. For example, in the event that the user believes that the user activity is compromised, the user may voice the security word or phrase, present a predetermined security gesture, or voice another contextual phrase indicating the compromise. The system may capture and analyze the word or gesture, in real time or near real time, and in response to identifying indication of compromise (for example, based on the context or based on identifying the security word or phrase in the user input), automatically present the predetermined security interface, extend one or more barriers, an/or block the transaction. For example, in the event that the user provides the security word or phrase during a transaction after completion of a first portion of steps, the system may initiate the presentation of the security interface, and automatically discard the data associated with the first portion of steps to ensure security of the user data. In some instances, the system may cease the presentation of the predetermined security interface and allow the user commence another activity, only after at least receiving another predetermined security word or gesture from the user and/or determining that the biometric triggers of the user occur within a predetermined normal range.

In some embodiments, based on determining certain predetermined triggers, the system may automatically stop or block user activities or transactions. For example, the system may determine that a first individual has been located at a first distance from the user at the terminal, for a predetermined time period. Based on determining that the first distance is below a predetermined threshold (for example, 2 feet or 3 feet), the system may determine that the user information displayed on the terminal may have been compromised and automatically block the user activity or transaction, discard any existing data of the current activity, and/or initiate the presentation of the security interface. Based on determining that the first distance is above a predetermined threshold (for example, 10 feet or 15 feet), the system may determine that the user information is unlikely to have been compromised and extend a barrier to reduce visibility of the terminal for the first individual to ensure security of user information. In some instances, the system may cease the presentation of the predetermined security interface and/or allow the user commence another activity after blocking the activity, only after at least determining that the predetermined triggers are not active.

It will be understood that any suitable computer-readable medium may be utilized. The computer-readable medium may include, but is not limited to, a non-transitory computer-readable medium, such as a tangible electronic, magnetic, optical, electromagnetic, infrared, and/or semiconductor system, device, and/or other apparatus. For example, in some embodiments, the non-transitory computer-readable medium includes a tangible medium such as a portable computer diskette, a hard disk, a random access memory (RAM), a read-only memory (ROM), an erasable programmable read-only memory (EPROM or Flash memory), a compact disc read-only memory (CD-ROM), and/or some other tangible optical and/or magnetic storage device. In other embodiments of the present invention, however, the computer-readable medium may be transitory, such as, for example, a propagation signal including computer-executable program code portions embodied therein.

One or more computer-executable program code portions for carrying out operations of the present invention may include object-oriented, scripted, and/or unscripted programming languages, such as, for example, Java, Perl, Smalltalk, C++, SAS, SQL, Python, Objective C, and/or the like. In some embodiments, the one or more computer-executable program code portions for carrying out operations of embodiments of the present invention are written in conventional procedural programming languages, such as the "C" programming languages and/or similar programming languages. The computer program code may alternatively or additionally be written in one or more multi-paradigm programming languages, such as, for example, F#.

Some embodiments of the present invention are described herein above with reference to flowchart illustrations and/or block diagrams of apparatuses and/or methods. It will be understood that each block included in the flowchart illustrations and/or block diagrams, and/or combinations of blocks included in the flowchart illustrations and/or block diagrams, may be implemented by one or more computer-executable program code portions. These one or more computer-executable program code portions may be provided to a processor of a general purpose computer, special purpose computer, and/or some other programmable data processing apparatus in order to produce a particular machine, such that the one or more computer-executable program code portions, which execute via the processor of the computer and/or other programmable data processing apparatus, create mechanisms for implementing the steps and/or functions represented by the flowchart(s) and/or block diagram block(s).

The one or more computer-executable program code portions may be stored in a transitory and/or non-transitory computer-readable medium (e.g., a memory, etc.) that can direct, instruct, and/or cause a computer and/or other programmable data processing apparatus to function in a particular manner, such that the computer-executable program code portions stored in the computer-readable medium produce an article of manufacture including instruction mechanisms which implement the steps and/or functions specified in the flowchart(s) and/or block diagram block(s).

The one or more computer-executable program code portions may also be loaded onto a computer and/or other programmable data processing apparatus to cause a series of operational steps to be performed on the computer and/or other programmable apparatus. In some embodiments, this produces a computer-implemented process such that the one or more computer-executable program code portions which execute on the computer and/or other programmable apparatus provide operational steps to implement the steps specified in the flowchart(s) and/or the functions specified in the block diagram block(s). Alternatively, computer-implemented steps may be combined with, and/or replaced with, operator- and/or human-implemented steps in order to carry out an embodiment of the present invention.

As used herein, a processor/computer, which may include one or more processors/computers, may be "configured to" perform a stated function in a variety of ways, including, for example, by having one or more general-purpose circuits perform the stated function by executing one or more computer-executable program code portions embodied in a computer-readable medium, and/or by having one or more application-specific circuits perform the stated function.

While the foregoing disclosure discusses illustrative embodiments, it should be noted that various changes and modifications could be made herein without departing from the scope of the described aspects and/or embodiments as defined by the appended claims. Furthermore, although elements of the described aspects and/or embodiments may be described or claimed in the singular, the plural is contemplated unless limitation to the singular is explicitly stated. Additionally, all or a portion of any embodiment may be utilized with all or a portion of any other embodiment, unless stated otherwise.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other changes, combinations, omissions, modifications and substitutions, in addition to those set forth in the above paragraphs are possible. Those skilled in the art will appreciate that various adaptations and modifications of the just described embodiments can be configured without departing from the scope and spirit of the invention. Therefore, it is to be understood that, within the scope of the appended claims, the invention may be practiced other than as specifically described herein.

INCORPORATION BY REFERENCE

To supplement the present disclosure, this application further incorporates entirely by reference the following commonly assigned patent applications:

| U.S. patent application Ser. No. | Title | Filed On |
| --- | --- | --- |
| 15/365,436 | CREATING A SECURE PHYSICAL CONNECTION BETWEEN A COMPUTER TERMINAL AND A VEHICLE | Concurrently herewith |
| 15/365,443 | COMPUTER TERMINAL HAVING A DETACHABLE ITEM TRANSFER MECHANISM FOR DISPENSING AND COLLECTING ITEMS | Concurrently herewith |

What is claimed is:

1. A computer terminal located in an environment, comprising:
  a display;
  an actuator;
  a retractable privacy barrier attached to the computer terminal by the actuator, the actuator being configured to extend the retractable privacy barrier, the retractable privacy barrier being configured to reduce viewability of the computer terminal after the retractable privacy barrier has been extended by the actuator;
  a memory;
  a communication interface;
  a processor; and
  a terminal application stored in the memory, executable by the processor, and configured for:
  initiating an interactive session with a user;
  determining that a trigger event has occurred;
  in response to determining that the trigger event has occurred, transmitting a control signal to the actuator, the control signal causing the actuator to extend the retractable privacy barrier;
  monitoring one or more parameters of the environment; and
  displaying, via the display, a graphical user interface, wherein the graphical user interface comprises data associated with the one or more parameters of the environment.

2. The computer terminal according to claim 1, comprising a sensor.

3. The computer terminal according to claim 2, wherein:
  the sensor is configured to detect a presence of the user;
  determining that a trigger event has occurred comprises detecting, via the sensor, the presence of the user; and
  the control signal is transmitted to the actuator in response to detecting, via the sensor, the presence of the user.

4. The computer terminal according to claim 2, wherein:
  the sensor is configured to monitor a first parameter of the one or more parameters; and
  displaying data associated with the first parameter on the graphical user interface.

5. The computer terminal according to claim 2, wherein:
  the sensor is configured to monitor a first parameter of the one or more parameters;
  determining that a trigger event has occurred comprises, based on monitoring the first parameter, determining that an environmental condition exists; and
  the control signal is transmitted to the actuator in response to determining that the environmental condition exists.

6. The computer terminal according to claim 5, wherein the terminal application is configured for:
  determining that the environmental condition no longer exists based on continuing to monitor the first parameter; and
  in response to determining that the environmental condition no longer exists, transmitting a second control signal to the actuator, the second control signal causing the actuator to retract the retractable privacy barrier.

7. The computer terminal according to claim 1, wherein:
  the terminal application is configured for monitoring one or more biometric parameters of the user;
  determining that a trigger event has occurred comprises determining, based on monitoring the one or more biometric parameters of the user, that a user condition exists; and
  the control signal is transmitted to the actuator in response to determining that the user condition exists.

8. The computer terminal according to claim 1, wherein:
  the terminal application is configured for:
  based on monitoring the one or more parameters of the environment, determining that an environmental condition exists; and
  in response to determining that the environmental condition exists, displaying an indicator that the environmental condition exists on the graphical user interface.

9. The computer terminal according to claim 1, wherein the graphical user interface comprises real-time data associated with the one or more parameters of the environment.

10. The computer terminal according to claim 1, comprising a detachable module, the detachable module comprising the actuator and the retractable privacy barrier.

11. The computer terminal according to claim 1, wherein the terminal application is configured for displaying a diagram of at least a portion of the environment adjacent to the computer terminal on the graphical user interface.

12. The computer terminal according to claim 1, wherein the computer terminal is an automated teller machine.

13. A system, comprising:
  the computer terminal according to claim 1;
  a sensor in communication with the computer terminal, wherein the sensor is configured to sense a first parameter of the one or more parameters;
  a second actuator in communication with the computer terminal;
  a second retractable privacy barrier positioned proximate to the computer terminal, the second actuator being configured to extended the second retractable privacy barrier, the second retractable privacy barrier being configured to reduce viewability of the computer terminal after the second retractable privacy barrier has been extended by the second actuator;
  wherein:
  monitoring the one or more parameters of the environment comprises receiving, via the communication interface, data associated with the first parameter from the sensor;
  the terminal application is configured for, in response to determining that the trigger event has occurred, transmitting a second control signal to the second actuator, the second control signal causing the second actuator to extend the second retractable privacy barrier.

14. A computer program product for providing physical security at a computer terminal located in an environment, comprising a non-transitory computer-readable storage medium having computer-executable instructions to:
   initiate an interactive session with a user;
   determine that a trigger event has occurred;
   in response to determining that the trigger event has occurred, transmit a control signal to an actuator, the control signal causing the actuator to extend a retractable privacy barrier attached to the computer terminal by the actuator, to reduce viewability of the computer terminal after the retractable privacy barrier has been extended by the actuator;
   monitor one or more parameters of the environment; and
   display, via a display of the computer terminal, a graphical user interface, wherein the graphical user interface comprises data associated with the one or more parameters of the environment.

15. A method for providing physical security at a computer terminal located in an environment, the method comprising:
   providing the computer terminal comprising;
   a display;
   an actuator; and
   a retractable privacy barrier attached to the computer terminal by the actuator, the actuator being configured to extend the retractable privacy barrier, the retractable privacy barrier being configured to reduce viewability of the computer terminal after the retractable privacy barrier has been extended by the actuator;
   initiating an interactive session with a user;
   determining that a trigger event has occurred;
   in response to determining that the trigger event has occurred, transmitting a control signal to the actuator, the control signal causing the actuator to extend the retractable privacy barrier;
   monitoring one or more parameters of the environment; and
   displaying, via the display, a graphical user interface, wherein the graphical user interface comprises data associated with the one or more parameters of the environment.

16. The method according to claim 15, wherein the computer terminal comprises a sensor, wherein:
   the sensor is configured to detect a presence of the user;
   determining that a trigger event has occurred comprises detecting, via the sensor, the presence of the user; and
   the control signal is transmitted to the actuator in response to detecting, via the sensor, the presence of the user.

17. The method according to claim 15, wherein the computer terminal comprises a sensor, wherein:
   the sensor is configured to monitor a first parameter of the one or more parameters; and
   displaying data associated with the first parameter on the graphical user interface.

18. The method according to claim 15, wherein the computer terminal comprises a sensor, wherein:
   the sensor is configured to monitor a first parameter of the one or more parameters;
   determining that a trigger event has occurred comprises, based on monitoring the first parameter, determining that an environmental condition exists; and
   the control signal is transmitted to the actuator in response to determining that the environmental condition exists.

19. The method according to claim 18, wherein the method comprises:
   determining that the environmental condition no longer exists based on continuing to monitor the first parameter; and
   in response to determining that the environmental condition no longer exists, transmitting a second control signal to the actuator, the second control signal causing the actuator to retract the retractable privacy barrier.

20. The method according to claim 15, wherein the method further comprises:
   based on monitoring the one or more parameters of the environment, determining that an environmental condition exists; and
   in response to determining that the environmental condition exists, displaying an indicator that the environmental condition exists on the graphical user interface.

* * * * *